(12) United States Patent
Andle et al.

(10) Patent No.: US 7,915,785 B2
(45) Date of Patent: Mar. 29, 2011

(54) REFLECTIVE AND SLANTED ARRAY CHANNELIZED SENSOR ARRAYS

(75) Inventors: Jeffrey C Andle, Falmouth, ME (US); Daniel S Stevens, Stratham, NH (US); Dong-Pei Chen, Nashua, NH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 12/610,642

(22) Filed: Nov. 2, 2009

(65) Prior Publication Data
US 2010/0043560 A1    Feb. 25, 2010

Related U.S. Application Data

(62) Division of application No. 11/828,370, filed on Jul. 26, 2007, now Pat. No. 7,633,206.

(51) Int. Cl.
*H01L 41/00* (2006.01)
*H01L 41/08* (2006.01)
*G01N 29/00* (2006.01)

(52) U.S. Cl. .................... 310/313 D; 73/597; 310/313 R

(58) Field of Classification Search .............. 310/313 D, 310/313 R, 311; 333/195, 196, 197; 73/597, 73/599, 23; 422/82.01; 435/6; *H01L 41/08, H01L 41/00; G01N 33/00*
See application file for complete search history.

(56) References Cited

U.S. PATENT DOCUMENTS

| | | | |
|---|---|---|---|
| 4,312,228 A * | 1/1982 | Wohltjen | 73/597 |
| 4,801,836 A * | 1/1989 | Mariani | 310/313 D |
| 4,912,356 A | 3/1990 | Mariani et al. | |
| 5,113,115 A | 5/1992 | Mariani | |
| 5,283,037 A * | 2/1994 | Baer et al. | 310/313 D |
| 6,075,898 A | 6/2000 | Chase | |
| 6,571,638 B2 | 6/2003 | Hines et al. | |
| 6,788,204 B1 | 9/2004 | Ianelli et al. | |
| 6,810,750 B1 | 11/2004 | Kiefer et al. | |
| 7,193,352 B1 | 3/2007 | Ballato et al. | |
| 2004/0072208 A1* | 4/2004 | Warthoe et al. | 435/6 |
| 2007/0046479 A1 | 3/2007 | Hines | |
| 2007/0052516 A1 | 3/2007 | Hines et al. | |

FOREIGN PATENT DOCUMENTS

WO    02099968 A1    12/2002

OTHER PUBLICATIONS

Puccio, D. et al., "SAW Sensors Using Orthogonal Frequency Coding", Frequency Control Symposium and Exposition, 2004, pp. 307-310, Electrical and Computer Engineering Dept., University of Central Florida.

Malocha, D.C. et al., "Orthogonal Frequency Coding for SAW Device Applications", Ultrasonics Symposium, 2004, pp. 1082-1085, Electrical and Computer Engineering Dept., University of Central Florida.

(Continued)

*Primary Examiner* — Walter Benson
*Assistant Examiner* — Karen Addison
(74) *Attorney, Agent, or Firm* — Vern Maine & Associates

(57) ABSTRACT

Reflective and slanted array channelized sensor arrays having a broadband source providing acoustic energy to a reflective or slanted array that reflects a portion of the incident signal to one or more sensing films wherein the response is measured.

5 Claims, 15 Drawing Sheets

OTHER PUBLICATIONS

Puccio, Derek et al., "Implementation of Orthogonal Frequency Coded SAW Devices Using Apodized Reflectors", Frequency Control Symposium and Exposition, 2005, pp. 892-896, Electrical and Computer Engineering Dept., University of Central Florida.

Reindl, Leonhard, "Wireless Passive SAW Identification Marks and Sensors", 2nd International Symposium Acoustic Wave Devices for Future Mobile Communication Systems, Mar. 2004, pp. 1-15, Chiba University.

Morgan, David P., "Surface-Wave Devices for Signal Processing", Studies in Electrical and Electronic Engineering 19, 1985, pp. 1-2, 10-15, 256-259.

Vetelino, J.F. et al., "Theory, Design and Operation of Surface-Generated Acoustic Wave Sensors", IEEE MTT-S Digest, 1994, pp. 505-508.

"Acoustic Wave Sensors", Nov. 9, 2006, [online] [retrieved on Nov. 9, 2006] Retrieved from the internet <URL://http://www.visensors.com/tech_ref/AWS_WebVersion.pdf>, pp. 1-44.

Auld, B.A. et al., "Signal Processing in a Nonperiodically Time-Varying Magnetoelastic Medium", Proceedings of the IEEE, Mar. 1968, 19 pages, vol. 56, No. 3.

Campbell, Colin K., "Applications of Surface Acoustic and Shallow Bulk Acoustic Wave Devices", Proceedings of the IEEE, Oct. 1989, pp. 1453-1484, vol. 77, No. 10.

* cited by examiner

REFLECTIVE AND SLANTED ARRAY CHANNELIZED SENSOR ARRAYS

RELATED APPLICATIONS

This application is a divisional of U.S. patent application Ser. No. 11/828,370, filed Jul. 26, 2007 entitled "Reflective and Slanted Array Channelized Sensor Arrays". This application is herein incorporated in its entirety by reference.

FIELD OF THE INVENTION

The invention relates to sensors, and more particularly, to dispersive acoustic sensing technology.

BACKGROUND OF THE INVENTION

A sensor is essentially a device that responds to a physical, chemical, biological, or electrical stimulus by generating an electrical output signal that is related to the input electrical signal and a condition to be measured. There have been significant advances in the sensing industry based on requirements and applications in diverse fields such as biochemical sensing for security to curing of concrete. For example, the airport screening measures employ sensors for explosives, radioactive and/or biological dangers. Unfortunately, the present sensing technology lacks the sensitivity and ability to accurately detect a broad range of stimulus. This is particularly true with respect to employing the electronic sensors in environments which are unable to isolate the sensitive electronic components from the surrounding conditions.

An acoustic wave sensor responds to some input stimulus by the transconduction of the input stimulus to a perturbation of the electronic properties of the acoustic wave device. An output signal is produced by the acoustic wave sensing that represents a function of the input signal, the sensor element's response and the environmental input stimulus. In most cases the acoustic wave device is a passive circuit element, having an output that is at the same frequency as the input signal. Only the transfer efficiency and phase at a given excitation frequency typically change; however there are circuits that adjust the frequency of a signal to follow a phase or amplitude condition. It is often said that the frequency changes in such devices when, in fact, only velocity and length change at a physical level.

The acoustic wave sensor typically has a sensing area, such as a sensing film, wherein the device is sensitive to mechanical and electrical perturbations such as mass loading, viscoelastic property variations, electroacoustic interactions, flexure-frequency effects, and force-frequency effects. The sensor responds to the input stimulus with a corresponding change in the resonant frequency of the acoustic wave device or the phase shift and/or amplitude of the device at a specified frequency such that the change in frequency can be used to indicate properties of the stimulus. The use of acoustic wave sensors has led to many new applications and uses including in-field applications.

Current acoustic wave gas sensors are typically based on mass loading of a sensing film upon exposure to a target analyte. Mass loading refers to measuring changes of the vibrating member due to an increase of the mass caused by an adsorption of some gas. A mass loaded resonator has electrodes that convert energy between electrical and acoustic energy, wherein the device vibrates at a frequency determined by the input electrical energy signal. The degree and ease with which vibration occurs is determined by the proximity of the frequency of excitation to the device's resonant frequency or frequencies. In some cases the external circuit is devised so as to maintain the excitation at the resonant frequency as in an oscillator or phase locked loop. In others, a property of the signal is modified in a manner determined by the excitation frequency's proximity to said resonances. As the gas molecules are adsorbed by the sensing film, the added mass of the gas molecules causes a change in the propagation or resonance of the acoustic wave device. For such a device the resulting change is a frequency decrease in an oscillator or a phase shift increase at a fixed excitation frequency.

Some examples of the current type of sensors include capacitance-based sensors. These devices tend to use thick film polymers to form a sensor array. Another type of sensor is a SiC resonator which typically uses a pre-concentrator to increase sensitivity. The SiC resonator typically uses thick film polymers to construct a sensor array, such as 2-5 microns and uses mass loading for detection via induced shifts in the resonant frequency of the SiC plate.

Surface generated acoustic wave (SGAW) devices and Bulk Acoustic Wave (BAW) devices are used in many sensing applications, wherein a change in frequency of the sensor is related to the amount of mass that gets adsorbed onto or absorbed into the sensing film.

The limitation of current technology is that the sensing films in use have limited selectivity and customers demand proper identification of the analyte. Customers also seek multifunctional sensors that are capable of identifying and measuring multiple analytes in a mixture. This has led to the use of sensor arrays containing several discrete sensor elements, typically limited in the published art to four or eight sensors by manufacturing and design constraints.

Due to the inherent manufacturing variations and signal cross-talk issues, these arrays consist of sensors at different frequencies with unused guard bands between them. This results in unnecessarily tight manufacturing tolerances and limited array sizes in the cramped electromagnetic spectrum for wireless sensors and a generally difficult burden of multiplicity of design and complex spurious signal interactions for wired sensors. One general feature of the present invention is to incorporate an array of distinct sensing mechanisms into a single sensor.

SUMMARY OF THE INVENTION

The present invention according to one embodiment relates to sensing technology based on responses to sensing materials and structures.

One embodiment is a sensing apparatus comprising an acoustic energy source providing an input acoustic energy to a first reflector array, wherein the first reflector array has a plurality of individual reflectors reflecting a portion of the input acoustic energy, and wherein the first reflector array provides a reflected signal with differing frequencies. The frequencies can be continuously varying or separated into frequency bands depending upon the arrangement of the individual reflectors. There is at least one sensing region proximate the reflector array, wherein at least some of the reflected signal impinges upon the sensing region providing an altered reflected signal. The sensing region can be a continuous sensing material with the same or varying sensing particulars. Alternatively, the sensing material can be a plurality of sensing areas. A transducer can be used to receive at least some of the altered reflected signal.

The individual reflectors, in another embodiment, are selected from the group consisting of continuously varying individual reflectors and sections of similar individual reflectors.

An additional feature includes a second reflector array proximate the sensing region with the sensing region disposed between the first reflector array and the second reflector array, wherein the second reflector reflects at least some of the altered reflected signal.

The transducer receiving the altered reflected signal can be selected from the group consisting of a common transducer which also provides the input energy source and a separate output transducer.

A further embodiment includes at least one of an in-line grating reflecting at least some of the input acoustic energy, an in-line grating reflecting at least some of the reflected signal, an in-line grating reflecting at least some of the altered reflected signal, and at least one end reflector reflecting at least some of the altered reflected signal.

A further aspect includes having an absorber material proximate at least a portion of a periphery of the apparatus.

In addition, a reference transducer receiving at least some of the input acoustic energy is a further feature.

At least one microelectromechanical system (MEMS) device proximate the sensing region can be used to provide gating for the reflected signal if the MEMS is before the sensing region or for the altered reflected signal if located after the sensing region.

A further embodiment includes a medium on at least a portion of the sensing region, wherein the medium is selected from at least one of the group consisting of a blocking medium and a phase shift medium. The blocking medium can provide better isolation and/or coding. The phase shift can be used to discriminate and otherwise provide for coding.

A matching medium can be disposed on at least a portion of the first reflector array to provide a better transition between the reflector segments.

The apparatus according to one embodiment includes having the apparatus, with its various components, disposed upon a shear horizontal (SH) RAC (SH-RAC) substrate.

In yet another feature, the sensing region is selected from at least one of the group consisting of polymer films, metal films, metal oxide films, enzymes, antibodies, DNA, and thin membranes.

One embodiment is a sensor system for detecting a target analyte, comprising providing an initial acoustic energy signal, reflecting portions of the acoustic energy signal by a reflector array to a sensing region, producing at least one altered acoustic energy signal, wherein the reflector array has a plurality of individual reflectors, and wherein the reflector array reflects more than one frequency. The system provides for receiving the altered acoustic energy signal, converting the altered acoustic energy signal into an altered energy signal and measuring a change between the initial energy signal and the altered energy signal for detecting the target analyte.

An additional aspect includes reflecting the altered acoustic energy signal by an additional reflector array to an output transducer.

The acoustic energy source in one embodiment is a common transducer and a further step is reflecting a portion of the altered acoustic energy signal back to the common transducer.

An additional feature is coding by at least one of the group consisting of disposing a blocking medium on portions of the sensing region and disposing a phase shift medium on portions of the sensing region.

One further embodiment is a slanted array sensor comprising a slanted source transducer converting a broadband electrical energy signal into a plurality of channels of narrow-band acoustic energy signals. There is at least one sensing region proximate the slanted source transducer, wherein at least one of the narrow-band acoustic energy signals impinges upon the sensing region and produces at least one altered acoustic energy signal. A slanted receiver transducer proximate the sensing region is provided, wherein the slanted receiver transducer receives at least one of the altered acoustic energy signals.

In addition, the slanted source transducer can be a slanted finger interdigital transducer and the slanted receiver transducer can be a slanted finger interdigital transducer.

Another feature includes a phase plate disposed between the slanted source transducer and the slanted receive transducer.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

A full understanding of the invention can be gained from the following description when read with the accompanying drawings.

DETAILED DESCRIPTION

Figure 1A:
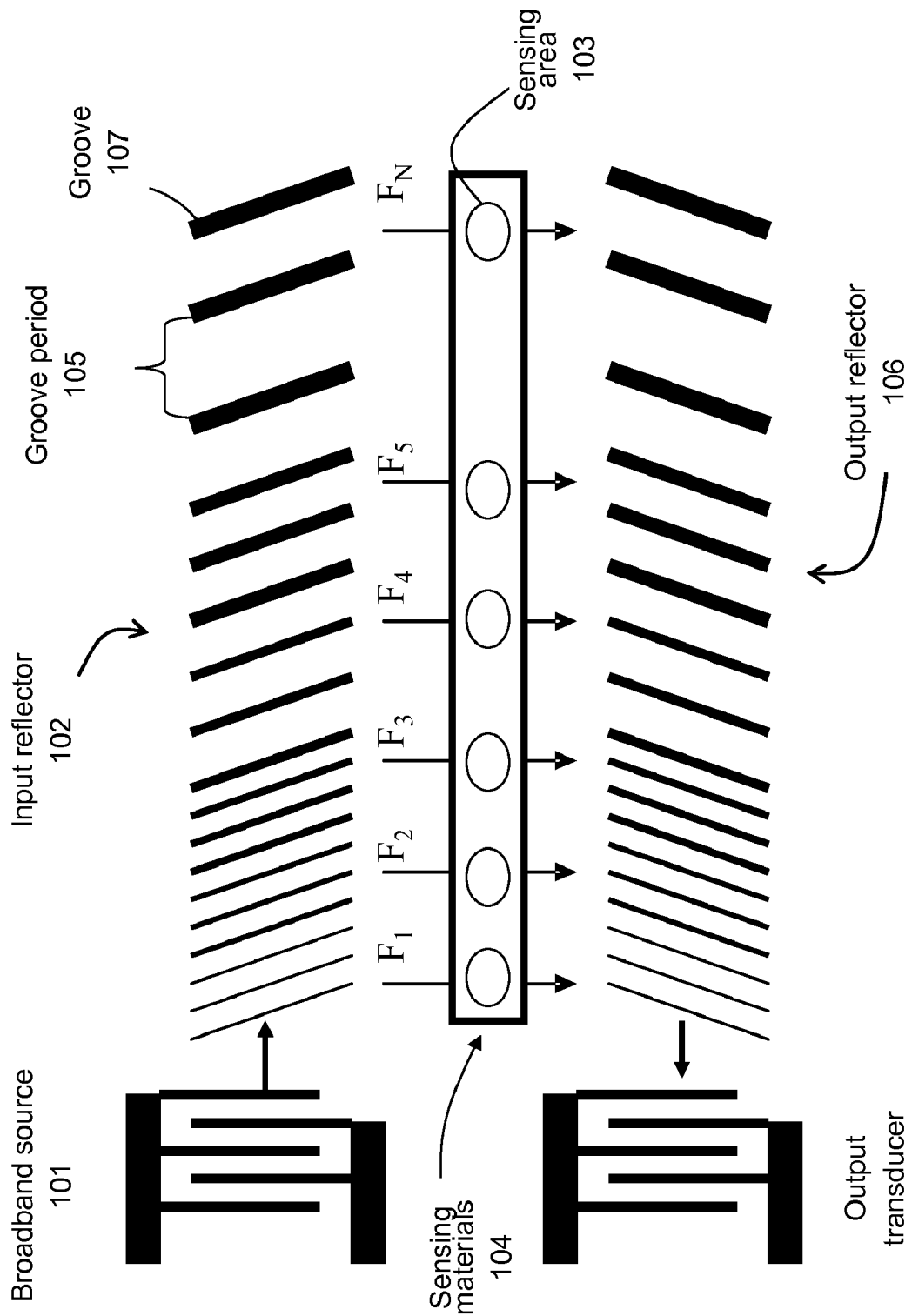
FIG. 1a is a reflective array compressor structure showing the different frequencies reflected onto sensing materials according to one embodiment.

A broad objective of the present invention is to improve current sensor technologies. Some of the improvements are based on the use of reflective array sensors and slanted arrays sensors.

In one embodiment by way of illustration, the sensing region experiences an increase in mass or an increase or decrease in elastic properties that causes a corresponding change in velocity in the propagation path of the sensor, said velocity change altering a phase shift or resonant frequency. The state of the art suggests a plurality of means by which an SGAW or BAW sensor may interact with the environment directly or mediated by a sensing film. The present invention discloses systems, devices, methods and apparatus for employing known sensing techniques and for brevity some of the methods themselves are not detailed herein. For illustrative purposes the discussions in the embodiment focus on an idealized polymer having a selective absorption of a target gas and presenting a pure mass loading sensing mechanism. Other effects introduce analogous sensor responses, although at a much less intuitive level of presentation. This single example will be understood to represent mass loading, viscoelastic changes, intrinsic stress effects, film induced flexure of the substrate, local temperature changes, electrostriction, magnetostriction, conductive or dielectric loading, strain (due to torque or pressure as well as the relief of film induced stress) and the myriad other possible physical, chemical and biochemical interactions.

As used herein, the term acoustic wave device shall be designated in a broad sense to include any device that operates as a resonator such as SAW, BAW, and TSM resonators, and is not limited to a particular material, shape or cut. One embodiment of the invention herein is disclosed with adequate enabling steps specifically for surface generated acoustic wave (SGAW), a term defined by John Vetelino (see for example, *Theory, design and operation of surface generated acoustic wave sensors*, Vetelino et al, Microwave Symposium Digest, 1994, IEEE MTT-S International, 23-27 May 1994 Page(s):505-508 vol. 1) to mean any acoustic wave that is generated at, detected at, and interacts with the surface of the piezoelectric. It includes SAW (SH and Rayleigh), leaky SAW, Love, Lamb, acoustic plate mode, shallow bulk acoustic wave, surface skimming bulk wave, and the like. Nonetheless, the use of ferroelectric domain reversals allows similar reflective gratings to be implemented for dispersive oblique reflections in a BAW device and this sort of extension is contemplated.

While the descriptions make reference to a piezoelectric SGAW using an interdigitated transducer, other sources/detectors are within the scope of the invention, such as using a wedge transducer to convert the thickness extensional wave of an external BAW transducer into the Rayleigh mode of a SAW and to subsequently detect said acoustic wave as an electrical signal. The methods and structures contemplated herein therefore extend directly to macroscopic mechanical devices using stainless steel or other non-piezoelectric media.

As used herein, reflector refers to any element that reflects energy, and may refer to individual reflectors. These individual reflectors can be arranged in so-called chirped arrays to be continuously varying with respect to reflected frequency or arranged into groups of predominately like reflectors wherein each group reflects a different frequency. Similarly, discussions of gratings are not limited in scope to metal gratings or etched grooves. According to one embodiment, gratings refer to any periodic plurality or pseudoperiodic chirped plurality of reflectors. Any quasiperiodic perturbation to the impedance of the acoustic wave will function as a grating and could be incurred through electrical effects such as periodic doping of a semiconductor or ferroelectric domain reversals. These principles apply wherever a reflector or grating is described herein.

For reference purposes, numerous examples and applications of SAW devices are described in the text by Colin Campbell in "*Surface Acoustic Wave Devices and Their Signal Processing Applications*", Academic Press 1989.

The sensing according to one embodiment described herein is based on the ability to physically spread a broadband signal into a geometrically disperse spectrum of frequencies, much like a prism bending white light into a rainbow. An example of this effect is the oblique angled reflector grating of the well-known reflective array compressor. A long, locally periodic, reflective grating is designed using slanted electrodes with a spatially varying period, called a chirped period. The manufacture of the reflective array compressor typically employs thousands of etched grooves to form the reflector elements. Another known manufacturing technique replaces the grooves with an array of dots to form a reflective dot array (RDA). The weighting via the grooves was implemented by controlling the depth of the grooves of the surface of the substrate, however the RDA weighting depends upon the number of dots and distribution of the dots. The RDA has the advantage of presenting a more continuous wave impedance as reflective angles are changed from oblique to in-line and as reflectivity is modulated in amplitude.

A reflective array compressor uses a broadband input electrical energy signal source and applies the signal to a transducer to excite the acoustic waves which impinge upon an array of reflective elements having varied locally-periodic spacing. In a monolithic structure this input source is typically an interdigital transducer or an analog variation thereof. In other implementations, such as a sensor using a stainless steel rod or bar, the transducer is the well known wedge transducer.

Different frequency components are reflected at predetermined regions by the local periodicity of the oblique angled reflective gratings, experiencing different propagation lengths, delay times, and phase shifts.

In a two port device, a corresponding oblique angled grating reassembles the frequency spectral components back into a second signal path which is directed to another transducer. In a one port device, a single transducer is used to transmit the acoustic waves and to measure the acoustic waves that are reflected back to the transducer by additional reflectors at the ends of the transverse paths.

In the signal processing device it is typically desired that the phase be quadratic with frequency (delay time vary linearly with frequency). The structure of FIG. 1*a* provides a mechanism with continuously varying path length as a function of frequency. Deviations from the ideal phase versus frequency response can be corrected using a phase plate (not shown) which slows the local wave by a phase shift proportional to its width. By tailoring this local width to correct the phase aberrations of the local frequency components it is possible to compensate the impulse response of the RAC.

Referring again to FIG. 1a, one embodiment based on this signal processing structure with continuous frequency reflectors illustrates a broadband source 101 generating acoustic energy to an input oblique angled reflector array 102. The input array 102 comprises a plurality of reflectors of variable pitch (local center to center spacing) and angular orientation to the incident input beam from the source 101.

The individual angled grooves or reflectors 107 individually divert from the broadband beam a portion of the signal from the broadband source 101. The term reflectors as used herein refer to any element reflecting energy. The signals diverted by the input angled reflector array 102 are incident upon some section of the sensing material 104 and further incident upon the output angled reflector array 106 that directs the incident beam to the output transducer 108. Subsequent processing (not shown) extracts the required information to determine the attributes of the sensing.

The sensing material 104 shown in this embodiment is a single continuous material, such as a tape, or the substrate itself, with a plurality of sensing areas 103 disposed thereon. As detailed herein, each of these sensing areas 103 can be for different target sensing. According to one embodiment, such a sensing material 104 can have a plurality of sensing films of various types and sizes. Sensing materials such as films, metal oxides, and even thin membrane to work with localized stress are known to those skilled in the art. The sensing region 104 is essentially any region in which the acoustic energy of a channel interacts with a parameter to be measured.

By placing sensor coating(s) or films 104 proximate the reflective gratings 102, 106, it is possible to measure the frequency-dependent effects of the sensing film. Such an implementation allows for analyte interaction for improved selectivity and/or measurement of a multiplicity of analytes using a linear array of sensing film "pixels", each sensing pixel affecting a predetermined frequency channel. This allows a single acoustic wave sensor to measure tens or even hundreds of different targets. Recent advances in the application of small dots of sensing material enable large arrays; however until now no suitable device structure allows such a sensor element capable of employing the large number of possible sensing pixels.

The reflectors or grooves 107 are disposed on or about a surface of a substrate with a geometry and groove period 105 defining an incident acoustic beam along which is applied the broadband signal source 101. The spectrum exiting the input reflective grating 102 has different frequencies ($F_1$-$F_N$) along different portions of the reflector 102, allowing the various frequencies to strike different portions of a sensor material 104. In this embodiment the high frequency signals are extracted first as noted by the fine pitch or smaller groove period 105.

The output reflector array 106 may be used in which the associated portion of the frequency spectrum is mutually reflected back into a collinear broadband signal that is coupled to an output transducer 108. In the case of 90° reflection this may be accomplished with the output array 106 being approximately identical and parallel to the input reflector array 102 thereby providing a dispersive acoustic device. Dispersive devices are typically implemented by reflecting the signals in a "U" path while nondispersive devices are obtained by reflecting the signal in a dog-leg path or a Z-path.

The specific angle of the reflector elements 107 of the input array 102 is based on the desired exit angle of the acoustic beam to the sensing film 104 and the anisotropy of the substrate of the device. In typical signal processing, the beam is diverted by the input slanted reflector array 102 at right angles however there are other applications that can reflect the beam at other angles. For example, three-fold symmetry of the crystal may indicate that reflections of 60° are preferable and the use of certain highly temperature compensated off-axis cuts may require other angles. In the reflective array compressor, from which this embodiment is derived, it is typical to employ right angle reflection, however symmetry considerations may dictate other options, and other angles are within the scope of the invention. Likewise, the desired exit angle from the output reflector array 106 to the output transducer 108 typically matches the angled reflection of the input reflector 102 however other output reflection angles are within the scope of the invention. It should be noted that in cases other than 90° reflection, either complementary reflection angles, $\phi$ and 180-$\phi$, must be employed or the path length through the various sensor films will differ. Both cases represent embodiments within the scope of the invention.

The sections of grooved elements 107 or fingers permitting the angled reflection are arranged such that they act as efficient acoustic wave reflectors for different signal frequencies. The effective number of fingers that interact with the wave at frequency, $f_i$, and is defined as $N_c$. For a typical reflective array compressor structure, this can be approximated by:

$$Nc \approx Np \approx fi \div fo\sqrt{TB}$$

Where Np=total number of electrode pairs; fo=center frequency of interest; fi=excitation frequency; TB=time-bandwidth product of the dispersion (T) and the bandwidth (B). $N_c$ must exceed the minimum number of fingers required to reflect the signal of interest, which can be approximately stated as $$\kappa N_c \sim 1,$$

where $\kappa$ is the reflective coupling per element.

The angle for the fingers 107 of the input reflector 102 to accomplish the desired slanted reflection from the broadband source 101 that is directed to the sensing material 104 and subsequently to a corresponding matching group of fingers on the output reflector 106 would normally have an angle of $\theta$=45 degrees relative to the propagation axis of the incident surface wave in an isotropic substrate. Due to the anisotropy, the angle may differ. The groove period (G) 105 can be expressed as: $G=\lambda_{in} \cos \theta$, wherein $\lambda_{in}$ represents the incident SAW wavelength and $\theta$ is the angle of the groove with respect to the SAW propagation axes.

While a typical reflective array compressor employs a continuously varying groove period, in one embodiment of the present design, a greater number of fingers or grooves for a particular frequency may be used to provide sufficient sensing capability. The fingers can be grouped in sections and may even include spacing on one or more sides of the grouped fingers to improve isolation. The number of fingers can be based on a number of parameters according to the design criteria and can include the reflectivity of material, the frequency of the section, and the sensing requirements. For example, the reflectivity of the fingers can be reduced so that the entire section has sufficient reflection characteristics as opposed to having a highly reflective first reflective finger. The structure, which resembles a compressor but does not follow the associated design rules, is called a reflective array channelized (RAC) sensor array. Historically the acronym, RAC, applies to the compressor and the re-use of the acronym is intentional to underscore the relationship of the channelized sensor array to the compressive filter.

Figure 1B:
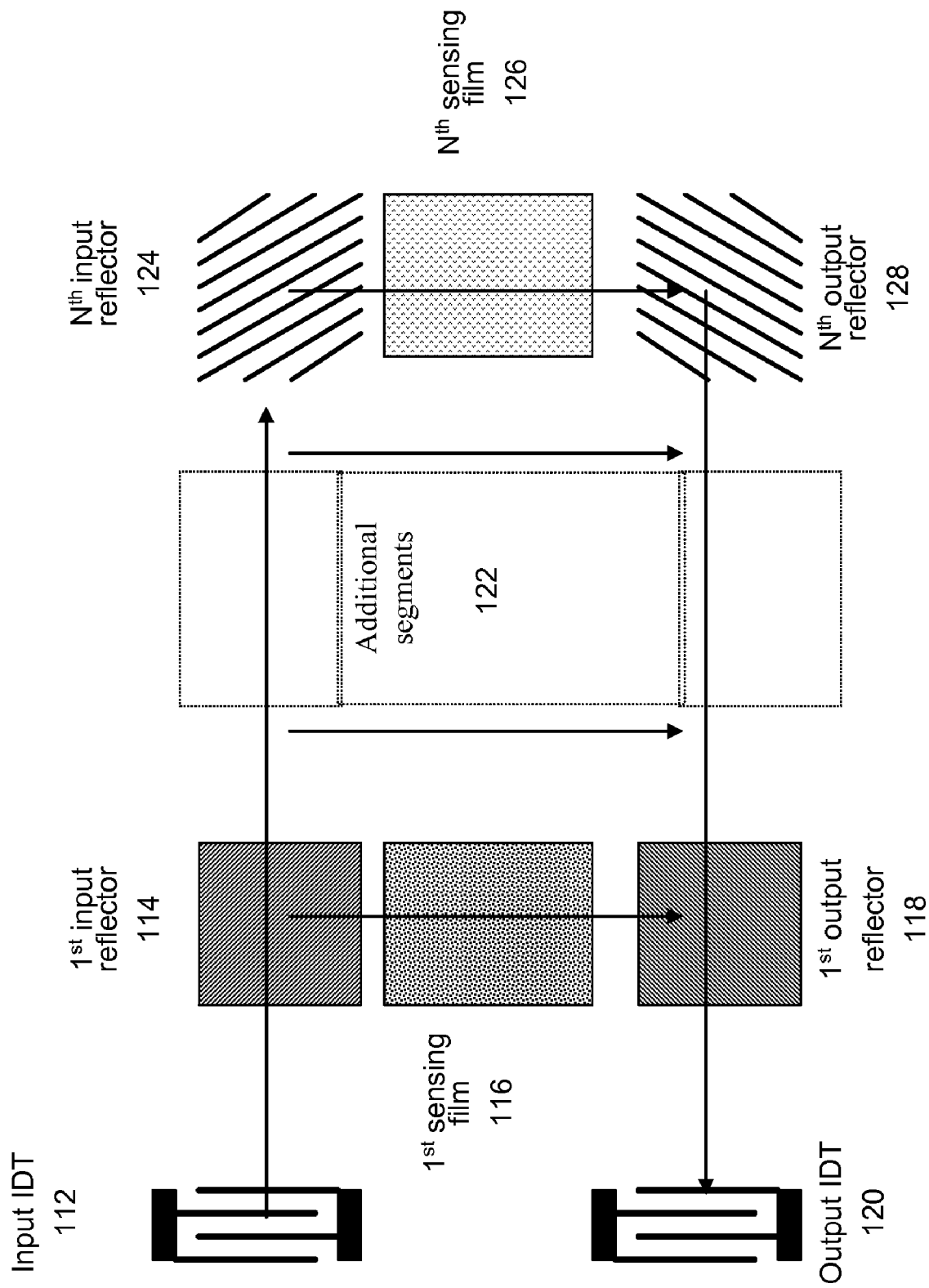
FIG. 1b is a reflective array channelized (RAC) sensor with multiple discrete oblique reflector segments according to another embodiment.

Referring to the embodiment of FIG. 1b, the reflector arrays are arranged to be more discrete and channelized for the sensing pixels by having sections of the reflector regions for an incident frequency band to provide sufficient sensing. An input broadband source 112 such as an interdigitated transducer (IDT) provides a broadband source that can be as broad as permissible or practical for the given application. The broadband source signal 112 is incident upon a plurality of angled input reflector gratings 114, 124 such that the applicable frequency signals for that particular grating is reflected. In this embodiment there is an array of reflectors starting with a fine pitch high frequency first input angled reflector grating 114 such that some of the incident signals are reflected. The reflected signals are then incident upon a first sensing material 116 and then incident upon a complimentary fine pitch high frequency first output angled reflector grating 118. There can be any number of additional segments 122 of reflector gratings with or without sensing films. There is an $N^{th}$ angled input reflector grating 124 that reflects its respective source signal to an $N^{th}$ sensing film 126, wherein the resulting signal is then reflected from a corresponding output reflective grating 128 to the output transducer 120. The output broadband transducer 120 receives the various signals from the complimentary reflector arrays. The sensing films can be similar to one another or entirely different composition, shape or size and intended for different sensing.

In operation, according to one embodiment an interdigitated transducer (IDT) launches a broadband signal that is incident on the input reflector array. There are numerous types of such transducers such as single phase, multi phase, unidirectional, and bidirectional. And, there are many different structures that can provide the desired functionality for generation of the acoustic energy, including adhered wedge transducers. The signal is beam-split into a continuous spectrum of signals at oblique angles impinging upon a sensing material and is then incident, typically broadside, onto a complementary reflector array. The spectrum is recombined into a broadband signal and is directed towards a broadband output transducer.

There is no specific requirement that a broadband signal be employed and it is equally within the scope of the invention to interrogate the specific desired sensing pixel using a narrowband or single-frequency excitation. In such a method, the frequency or band would be altered sequentially to interrogate a number of desired elements. In practice one element may offer excellent sensitivity to a number of different measurands but have poor selectivity. The pixel would be interrogated continuously as a trigger and, upon detection of an unspecified threat or exposure, the system would then interrogate the more selective but less sensitive pixels to determine the exact composition of the exposure.

Figure 1C:
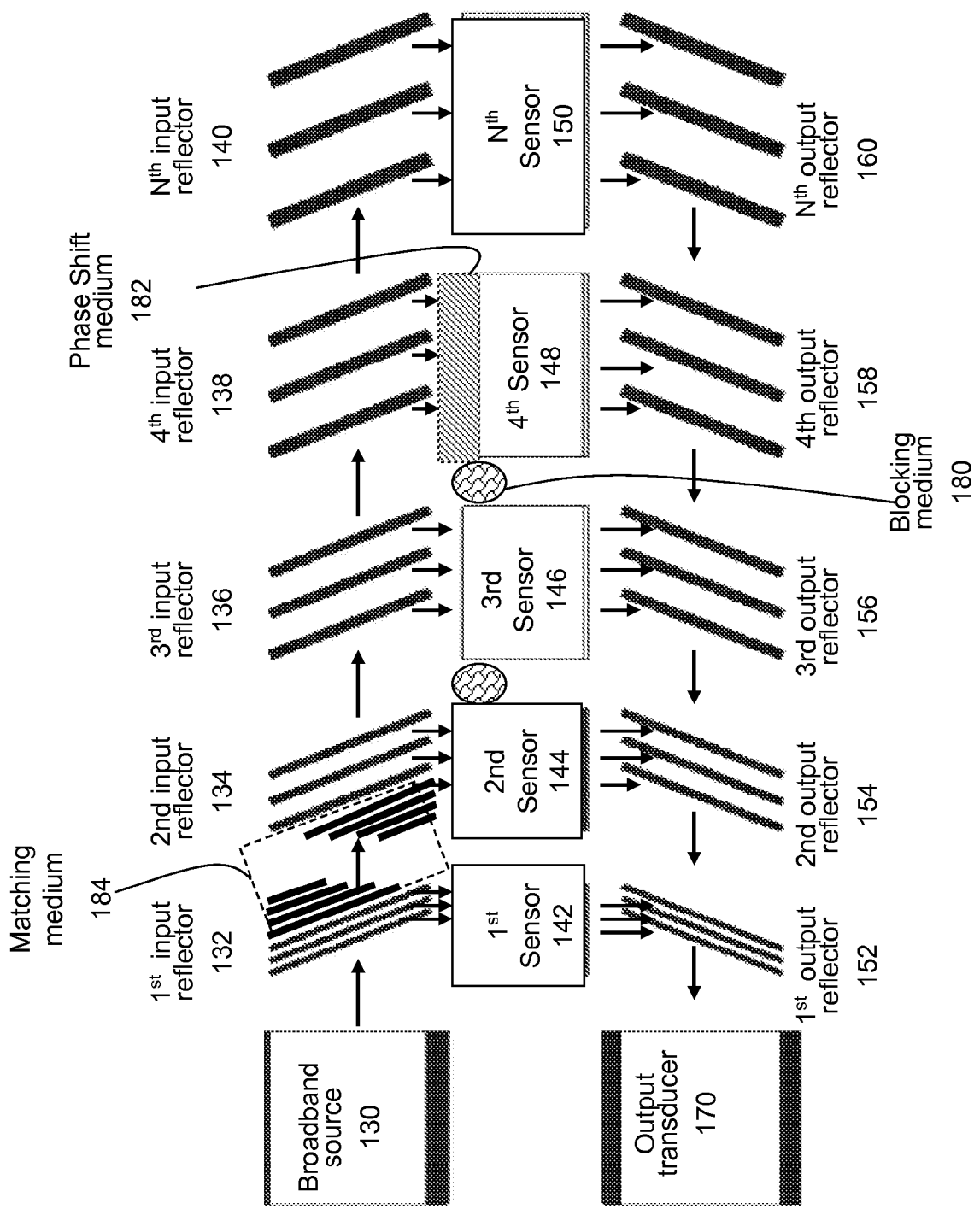
FIG. 1c is a reflective array channelized (RAC) sensor with multiple oblique reflector segments at the different frequencies reflected onto sensing films including a guard band medium and a phase shifting medium according to another embodiment.

FIG. 1c illustrates another embodiment of the sensing system showing the grouping of fingers or reflector regions such that the incident frequency band on the sensing material is across a section of the sensing material and provides sufficient sensing.

In more particular detail, the broadband source 130 provides the broadband signal to an array of oblique angled input reflector segments 132, 134, 136, 138, 140. It should be understood that there can be any number of input reflector segments. Each of the input reflector segments comprises a number of reflectors or fingers wherein the number/shape of the fingers can be processed for particular design criteria. The respective frequency for the designated grating section 132, 134, 136, 138, 140 is reflected onto respective sensing films 142, 144, 146, 148, 150. Once again, there can be any number of respective sensing materials for corresponding reflector sections. As noted, the sensing areas can be of different shapes and sizes depending upon the desired sensing.

The respective frequency segments are then incident upon the output reflectors 152, 154, 156, 158, 160 wherein the output signals are combined and coupled to the output transducer 170.

According to one embodiment, the input reflector segments 132, 134, 136, 138, 140 are not abrupt with respect to sequential segments but rather have matching mediums 184 to serve as a transition between the frequency segments. In one embodiment the reflector array has contiguous segments wherein the intermediary matching medium 184 would allow for a smooth transition allowing reflection without undue scattering. The matching medium 184 is only shown on one of the reflector array segments for convenience but may be implemented on all the gratings for both input and output.

According to one embodiment, certain areas along the reflector array can have a blocking medium 180 so that there is an attenuated or no signal at that particular frequency and there is essentially a dead zone in frequency response. The blocking medium 180 can be, for example, a coating or stripe of silicone rubber or other polymer applied proximate, such as between channels, to cancel some frequency response and provide improved isolation. The blocking medium is typically a material that attenuates or absorbs acoustic waves. The use of a number of blocking mediums 180 can be used in one embodiment to establish a bit coding sequence for that sensor or to implement guard bands. This would allow a coding such that a sequence of blocked frequencies would identify a particular sensor system.

In a further embodiment, these channels can be coded with a fixed phase-shift code by using a phase shift medium 182. The means and mathematics of matched filter coding, both discrete (digital) and continuous (analog) is well known to those in the art. For example, one illustration of a Barker code SAW device is explained by B. A. Auld, *Acoustic Fields and Waves in Solids*, Vol. II. New York: Wiley, 1973. Any number of channels can have a phase shift medium 182 to uniquely identify the particular sensor from among other sensors.

Each channel could have a nominal phase code region that was unique and a sensor region that provided a small perturbation that was simultaneously measurable but not destructive to the reliable identification of the code.

By placing distributed pits or phase shifts in the lateral coupling path it is possible to encode a desired bit sequence into a sensor, making each sensor uniquely identified.

As detailed herein, one embodiment of a reflective array sensor is with a continuous sensor region. While it is possible to employ multiple pixels of sensor film, depending upon the usage, the smooth distribution of spectral content may incur significant cross-talk between sensor channels. The use of wider sensing regions and guard bands with respect to certain channels can be used to increase sensitivity. There are also applications where a single sensor interaction is to be studied as a function of frequency or of a parameter that varies with position, such that the sensing film is the same across a number of frequency segments. One clearly useful example is to establish a temperature gradient along the sensor and explore the thermal desorption and adsorption kinetics of a gas-polymer or an antibody-antigen or a DNA-DNA interaction.

Such a sensor is readily applicable to the frequency-selective measurements of local strain, temperature gradients, or chemical gradients. One such embodiment would allow a real time gas chromatography system. By inserting the device into a liquid and measuring the cut-off frequency of damping, a level sensor is obtained. With proper materials selection to allow fluid phase operation, local viscosity and therefore phase boundaries can be identified. Of particular interest is an evaluation of the cross diffusion of antibody and antigen or of single stranded DNA from opposite ends of the film. Liquid chromatography would be accomplished by observing the migration in real time as local changes in properties. Selective detection of reactions between the counter-diffusing biochemicals would result in a slowing or stoppage of diffusion due to size and charge changes.

Figure 2:
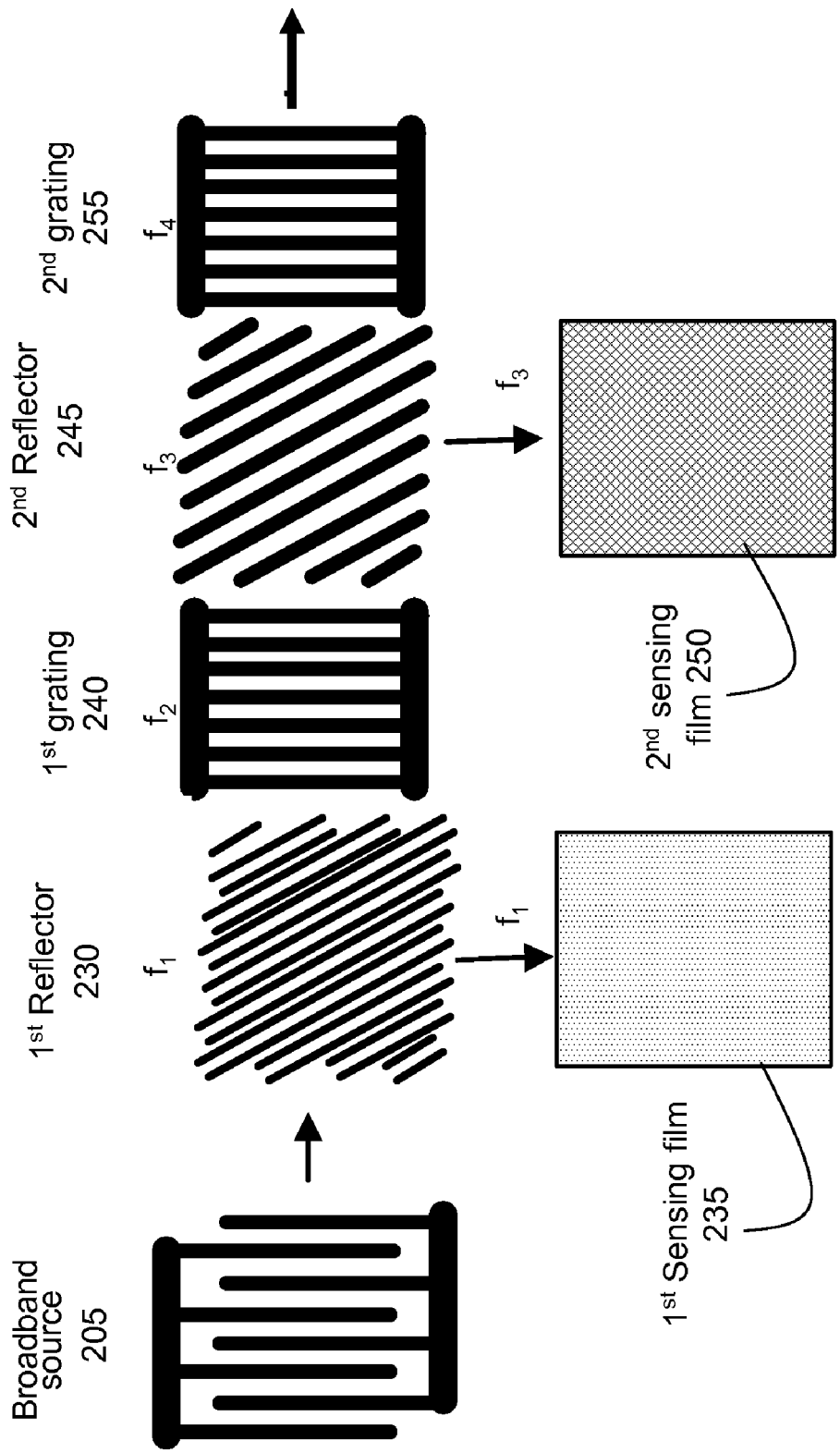
FIG. 2 is a portion of a reflective array channelized (RAC) sensor showing a common transducer, oblique gratings, and in-line gratings according to one embodiment.

Referring to FIG. 2, an embodiment is shown for the input half of a reflective array sensor having discrete sensor sections (pixels). The reflective array sensor employs a broadband source 205. Broadband is construed to cover multiple sub-bands and not to suggest any specific minimum bandwidth. The broadband source 205, which in this example is an interdigital transducer (IDT), provides an acoustic beam that substantially defines a distribution path from which the sub-bands are extracted and distributed to the appropriate sensing film pixels 235, 250. The broadband source 205 may be unidirectional in order to obtain higher efficiency, or it may be bidirectional for manufacturing and design criteria. In particular, single phase unidirectional transducers have gain-bandwidth limitations that are well known.

Narrowband signals $f_1$, $f_3$ are diverted from the distribution path into a specific frequency-addressable transverse sensing path using oblique reflectors 230, 245. The oblique angled reflector 230, 245 and sensing film 235, 250 can be 'matched' so that they are optimized for a particular sensing application. In other words, the angled reflectors can allow for a certain frequency bandwidth that is optimal for a corresponding sensing film. In one embodiment the gratings 240, 255 can be used to establish reference signals for the respective angled reflectors 230, 245. The $1^{st}$ grating 240 reflects some signal $f_2$ which can be used to establish a reference pair with the $f_1$ signal that impinges upon the $1^{st}$ sensing film. While there may be a difference in frequency, the reference signal $f_2$ can be used to help establish the parameters from the sensing process. Similarly, the $2^{nd}$ grating 255 and the reflected signal $f_4$ can establish a reference pair with the $2^{nd}$ reflector 245 to aid in discriminating the sensing film properties of the $f_3$ signal that impinges upon the sensing film 250.

There are some advantages to having one or more sub-bands assigned as reference channels in order to remove the effects of the distribution channel on the sensor response. Thus, according to one embodiment, one or more of the narrowband frequencies are not used as environmentally responsive sensing measurements.

The signal band from the broadband source 205 is incident upon the $1^{st}$ reflector and reflects some frequency component $f_1$ to the $1^{st}$ sensing film 235. Some portion of the signal passes the $1^{st}$ reflector 230 and has some portion of the signal that may be absorbed and/or allowed to continue on to the $2^{nd}$ reflector 245 after passing through the optional $1^{st}$ in-line grating 240. The acoustic waves $f_3$ reflected by the $2^{nd}$ grating 245 impinge upon the sensing film 250. Once again, the incident signal that passes the $2^{nd}$ reflector 245 may be incident upon an optional $2^{nd}$ in-line reflector 255 and can proceed to other sections, an absorber or an output transducer. As used herein, in-line grating is essentially a grating that reflects at least some of the signal back into the path from it came.

According to one embodiment the $1^{st}$ reflector 230 reflects a first frequency and the $1^{st}$ in-line grating 240 reflects a slightly different frequency $f_2$ in the RAC structure. Such optional in-line reflectors can return the reflected signal $f_2$ to the bi-directional transducer 205 for one-port embodiments of the sensor. Even though the reflected signals $f_2$, $f_4$ from the in-line gratings 240, 255 are at a different frequency than the sensing frequencies $f_1$, $f_4$, they are typically close enough to serve as a calibration signal for the sensor measurements. Thus, in this embodiment, the sensor is self-calibrating as the reflected signals from the in-line gratings 240, 255 provide a signal that is unaffected by the sensing films 235, 250. Alternately by omitting the in-line gratings and employing an in-line output reference transducer, it is possible to obtain a calibration signal reference for a transmission two-port structure.

By way of illustration of the self-calibrating feature, if the sensor device employs 10 frequency bits, implemented as five sensor bits and five reference bits, and each sensor path, $f_{2n-1}$, has an associated reference path at $f_{2n}$, the response would include sensor measurement (f1), reference measurement (f2), sensor measurement (f3), reference measurement (f4), sensor measurement (f5), reference measurement (f6), sensor measurement (f7), reference measurement (f8), sensor measurement (f9) and reference measurement (f10). Frequencies f2, f4, f6, f8 and f10 would be reflected back to the input transducer if in-line reflectors were used or transmitted to the reference output transducer otherwise.

It is noted that there are interferometer systems in which $f_{2n-1}$ and $f_{2n}$ would desirably be equal and there is no contrary indication. In this case the oblique reflector should divert only a portion of the energy so that the transmitted portion is reflected by the associated in-line reflector. Such an arrangement should be considered wherever oblique and in-line reflector pairs are considered, however the more general case of differing channelization is also to be considered.

There can be an end reflector (not shown) after the sensing films 235, 250 wherein the narrowband signals may be reflected directly back through the sensing films and oblique reflectors to the bi-directional source transducer 205. Alternatively, the signals that go through the sensing film can be reflected to an output transducer (not shown) and subsequently processed. Alternatively, there can be an in-line output transducer (not shown) as a reference source or an optional absorber.

In the case of a bidirectional transducer forward and reverse distribution paths are established. If only one path is sampled, it is typically desired that the other path be absorbed to prevent unwanted reflections, although this is not a requirement.

There are certain manufacturing advantages to extracting the highest frequency bands closest to the source 205 since lower frequency signals experience less degradation in high frequency gratings than vice versa. Thus according to one embodiment, the highest frequency sensing is performed closest to the source 205 and lower frequency sensing at the output. In the case of relatively narrow bandwidths (a few percent or smaller) there will be little difference. In another embodiment the highest and lowest frequencies are extracted first and the midband frequencies last, allowing the cumulative losses in the distribution path to be balanced by the higher efficiency at the source transducer's center frequency.

Figure 3:
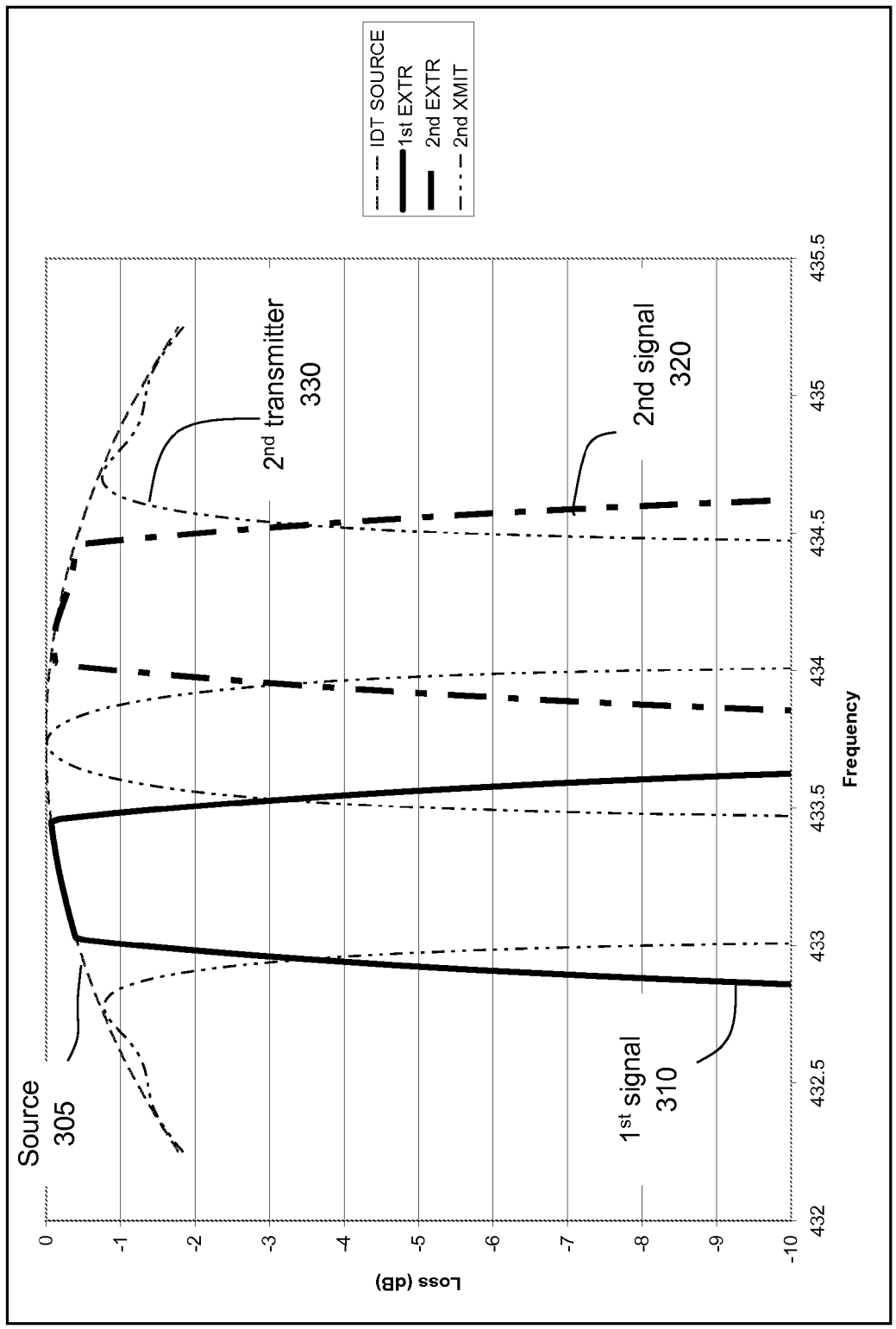
FIG. 3 is a graph showing a signal response of the extracted signals at the in-line and oblique reflectors as well as the transmitted signal according to an embodiment of the invention.

Referring to FIG. 3, an illustration of a reflected array response for two reflectors and residual signal with three lobes of signal getting through the reflectors is depicted. The following illustrates the $sinc^2$ response of a simple IDT source (dashed line—305) with a 100 period IDT having first signal extraction at 433.25 MHz (solid line—310) and 434.25 MHz (dash dot line—320). The remainder $2^{nd}$ transmitter signal (dash double-dot—330) continues to the output transducer or is dissipated in an acoustic absorber. Alternately this signal could be reflected back to the input as a reference signal.

In this embodiment the signal is in the ISM band. By way of illustration, in a sensor system designed for the 434 MHz Industrial Scientific Medical (ISM) band, "broad" indicates only about a 0.5% fractional bandwidth, whereas in the 915 MHz ISM band, this indicates approximately 3% bandwidth. In other cases, broad could be construed to mean any bandwidth up to the practical limits of the broadband source.

Figure 4:
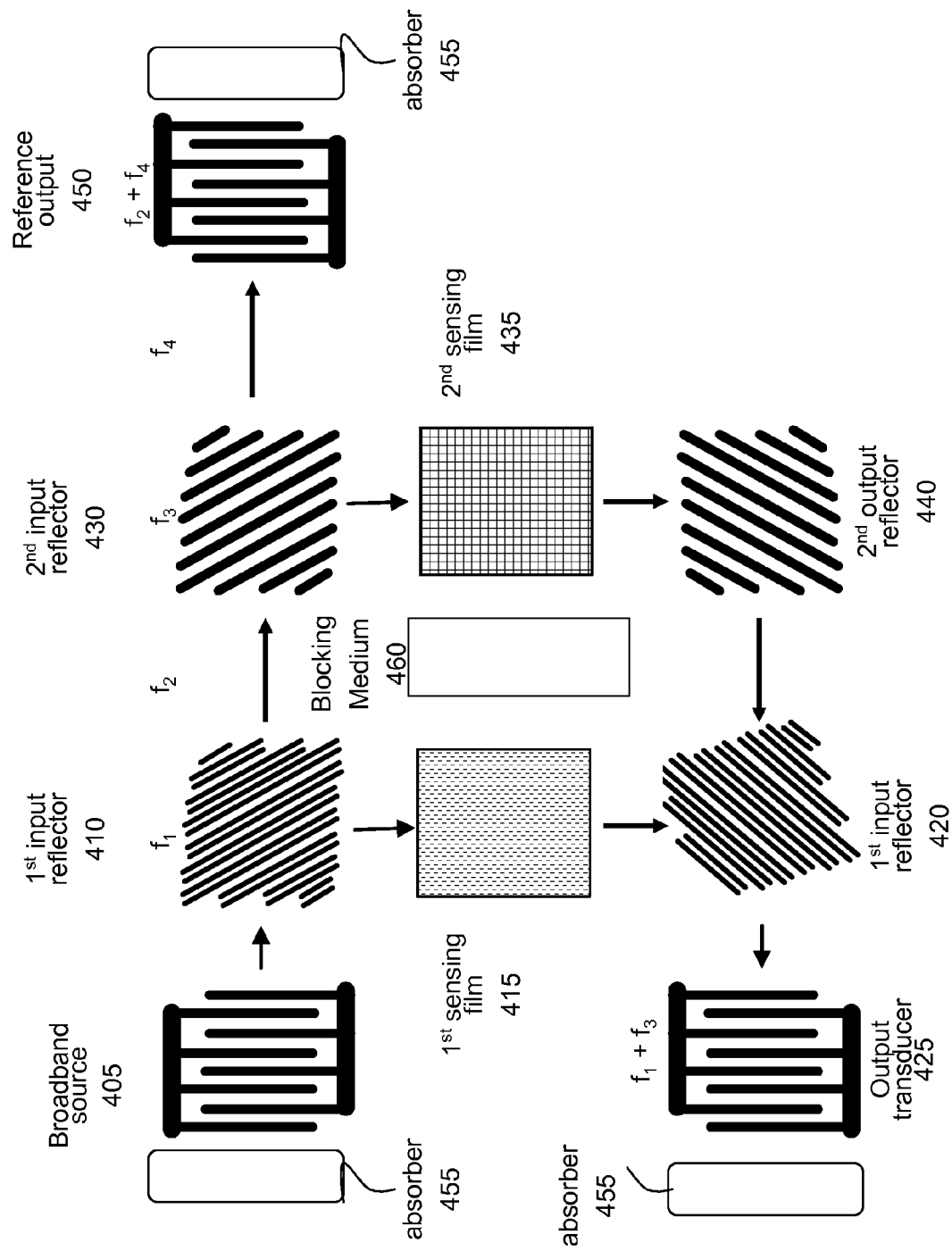
FIG. 4 is a reflective array channelized (RAC) sensor with a reference output according to one embodiment. A blocking medium implements a frequency guard band or encoding scheme.

Referring to FIG. 4, another embodiment with a reference transducer is depicted. Sensors employing transmission measurements will typically require an input source and at least one output mechanism such as an output transducer. As noted, a certain frequency band from the broadband source 405 is reflected by each of the reflector segments 410, 430 to a corresponding sensing film 415, 435 wherein the signal is influenced by the sensing film. The signals in the various transverse sensor paths are then redirected by additional oblique angled reflectors 420, 440 into a longitudinal accumulation path which is measured by the sensor output transducer 425.

One variation includes a reference output transducer 450 located at the terminus of the longitudinal distribution path so that it is not affected by sensing film. Transmission sensors generally offer higher resolution measurements but are not well suited to passive wireless sensor systems. In this example, the output transducer 425 receives the sum of the reflected signals and reference transducer 450 would be used to help detect the residual signal.

According to one embodiment, a guard band 460 is included where an absorber material is disposed between/proximate adjacent sensing films to provide better isolation between the sensing pixels or bits. The guard band 460 can be deployed around each of the sensing films or only about those sensing measurements that are more difficult to obtain. Different line widths are within the scope of the invention for the $1^{st}$ reflector segment path 405-410-415-420-425 as compared to the $2^{nd}$ reflector segment path 405-430-435-440-425, as might be required if the input and output paths are along different crystalline axes. The pitch of the reflectors in one pair (e.g. 410 and 420) will typically be different than the other (e.g. 430 and 440). However, for example, in a system having a total bandwidth of 10% and comprising ten channels each having 1% bandwidths, the variation in pitch from one array to the next will merely be ~1% and will be difficult to discern visually.

There can be one or more absorbers 455 located in the sensing system, such as the absorbers 455 shown herein to improve signal processing by absorbing unwanted reflections. Polymers such as photoresist, silicones and the like are typical materials suitable as absorbers.

The reflective array channelized sensor structure for transmission measurements is well suited to swept frequency measurements (either continuously or discretely stepped), in which each specific frequency is acoustically steered either to the reference output transducer or through one of the sensing film regions to the sensor output in a sequential manner as the frequency is varied. When the effects of temperature and other parameters do not significantly move the various frequency bands, single frequency per sensor region addressing is suitable. The advantage of this approach over discrete sensor arrays is that the bands are self-defining relative to one another, allowing a swept measurement to "locate" each band regardless of frequency drift of the entire array. Such two-port measurements and structures are one embodiment for wired applications in which it is simple to connect multiple transducers (input, reference and output) to multiple points of instrumentation. Such wired transmission measurements will place the fewest constraints on device design.

Figure 5:
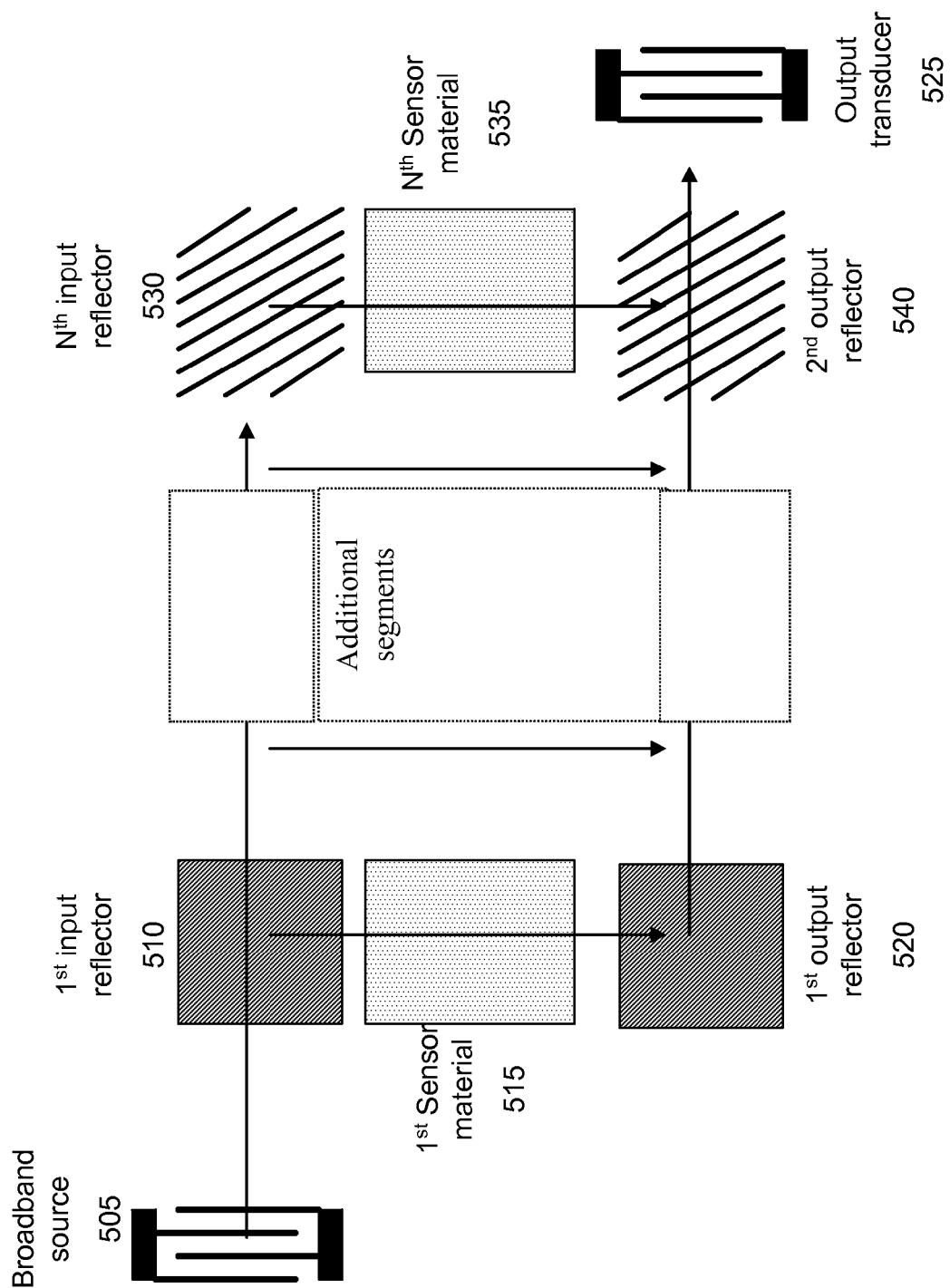
FIG. 5 is a reflective array channelized (RAC) sensor with multiple segments with the output transducer opposing the input transducer according to one embodiment.

Referring to FIG. 5, a further embodiment includes a sensing system wherein there is a distinct output transducer on an opposing side to the broadband source. In this dog-leg path embodiment, the path lengths are approximately the same mechanical length so that the signals are synchronous in time, offering little or no "compression" of the original reflective array compressor filter. The high frequency signals traverse the low frequency signals and in certain embodiments this results in poor performance, however there are certain implementations that may warrant such a configuration.

In more particular detail, a broadband source 505 generates the broadband signal to the array of input oblique angled reflector segments 510, 530 and the respective signals are reflected to sensing materials 515, 535. The output signals from the sensing films 515, 535 are then reflected by the output oblique angled reflector segments 520, 540, however in this embodiment the output reflector segments 520, 540 have the same angular orientation so that the signals are reflected to the output transducer 525 which is located opposing the broadband source 505. In this manner, if the reflectors are arranged such that the signals from the broadband source 505 travel from high frequency to low frequency, the high frequency signals travel through low frequency reflectors before arriving at the output transducer 525. In very broadband systems this is undesirable; however there may be other practical reasons with moderate bandwidth.

Alternatively, the high frequency signals can be processed last by reconfiguring the reflectors so that the low frequency paths are nearest the broadband source.

Figure 6:
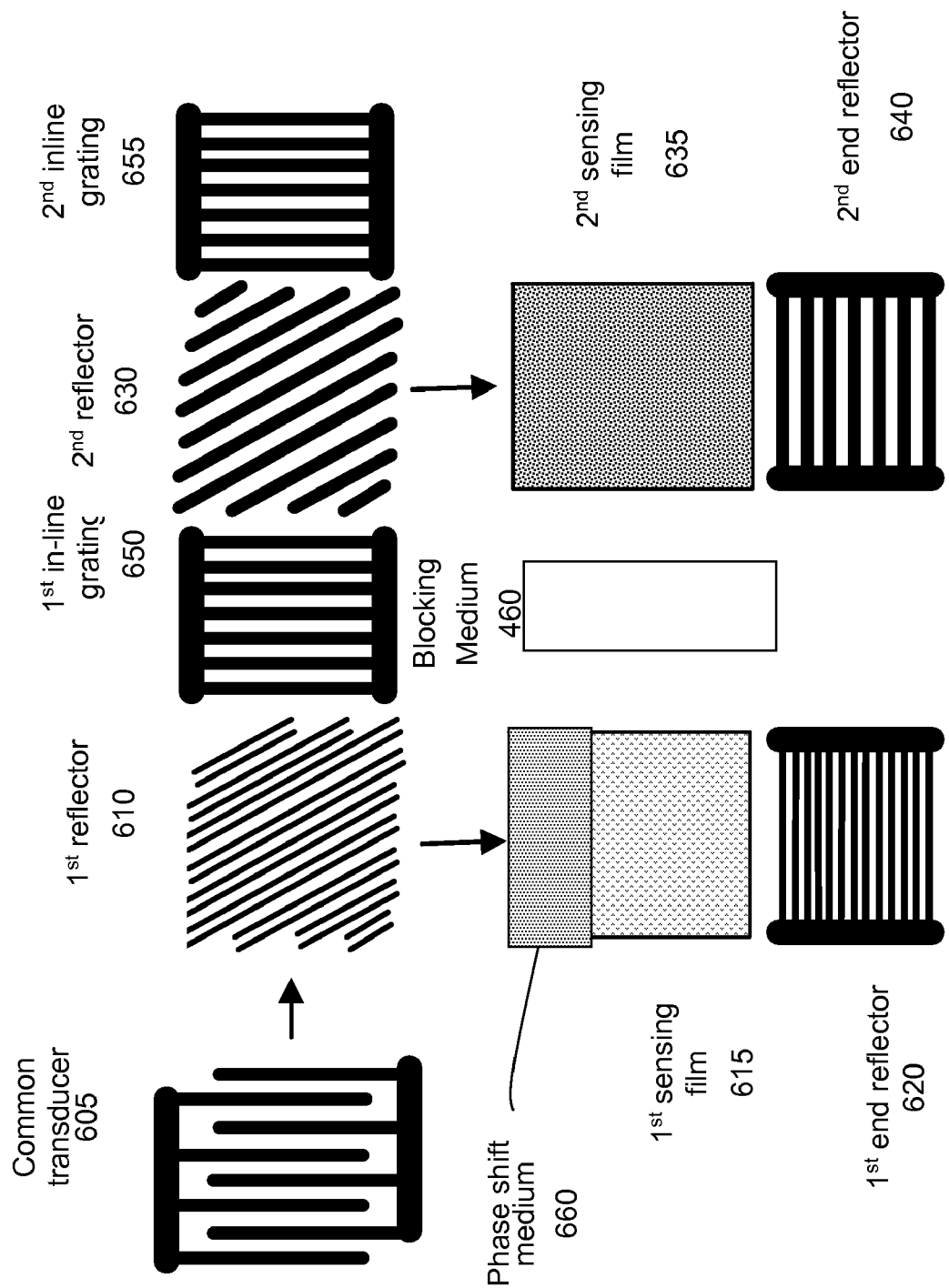
FIG. 6 is a reflective array channelized (RAC) sensor with a common transducer including in-line reflectors and end reflectors to implement a one-port echo-based sensor according to one embodiment.

An application of the invention is as a passive wireless sensor. According to one embodiment, a single transducer serves as both the input and the output. Referring to FIG. 6, a single common transducer 605 provides the broadband source signal to the input oblique angled reflector segments 610, 630 and optional in-line gratings 650, 655. The common transducer 605 also serves as the output transducer.

Reference signals are obtained from in-line reflectors 650, 655 for the respective frequencies wherein the in-line reflected frequencies $f_2$, $f_4$ can be used as reference signals to discern the sensed properties. Sensor signals $f_1$, $f_3$ that are influenced by the sensing film 615, 635 are reflected back into the transverse sensor path by end reflectors 620, 640 then re-coupled into the longitudinal distribution path by the oblique angled reflectors 610, 630 and coupled to the common transducer 605.

As previously indicated, a phase shift material 660 can be deposited in particular channels to shift the phase characteristics of the channel path which can be used for coding the sensor unit. In more particular detail, the phase shift material can be patterned Aluminum or grating with different line to space ratio to change the speed of the waveform. Blocking mediums (not shown) can also be included to isolate the channels.

There is some time delay as the signals are returned to the common transducer 605. If a band-limited impulse (sine burst) is used to simultaneously excite all of the channels, the resulting signal will consist of echoes of each channel, delayed and attenuated by the effects of the selected sensor films. Signal processing of the reflected spectra can be used to extract the delay time or phase shift and the attenuation in each sensor path, which in turn can be correlated to a sensor measurands in that region. Resolution and sensor-specific encoding can be accomplished using matched filter methods. More narrowly band-limited sine bursts can address individual pixels in the same manner.

The end reflectors 620 and 640 can be continuous, narrowband reflectors or could incorporate specific bit-sequence codes by having a predetermined reflector sequence introduced to each reflector. As noted, each end reflector 620, 640 is designed for the incident frequency from the angled reflector 610, 630. Alternately entire bits can be used for coding using a phase shift medium or coating 660 or phase plates on one or more end reflectors to establish a code for the sensor. In the latter case, interrogation with a complementary bit-sequence would allow a specific sensor to be identified and also allow processing gain of the otherwise low level spread spectrum signal. As discussed previously, it is possible to use simultaneous encoding and sensing within certain design constraints.

Figure 7:
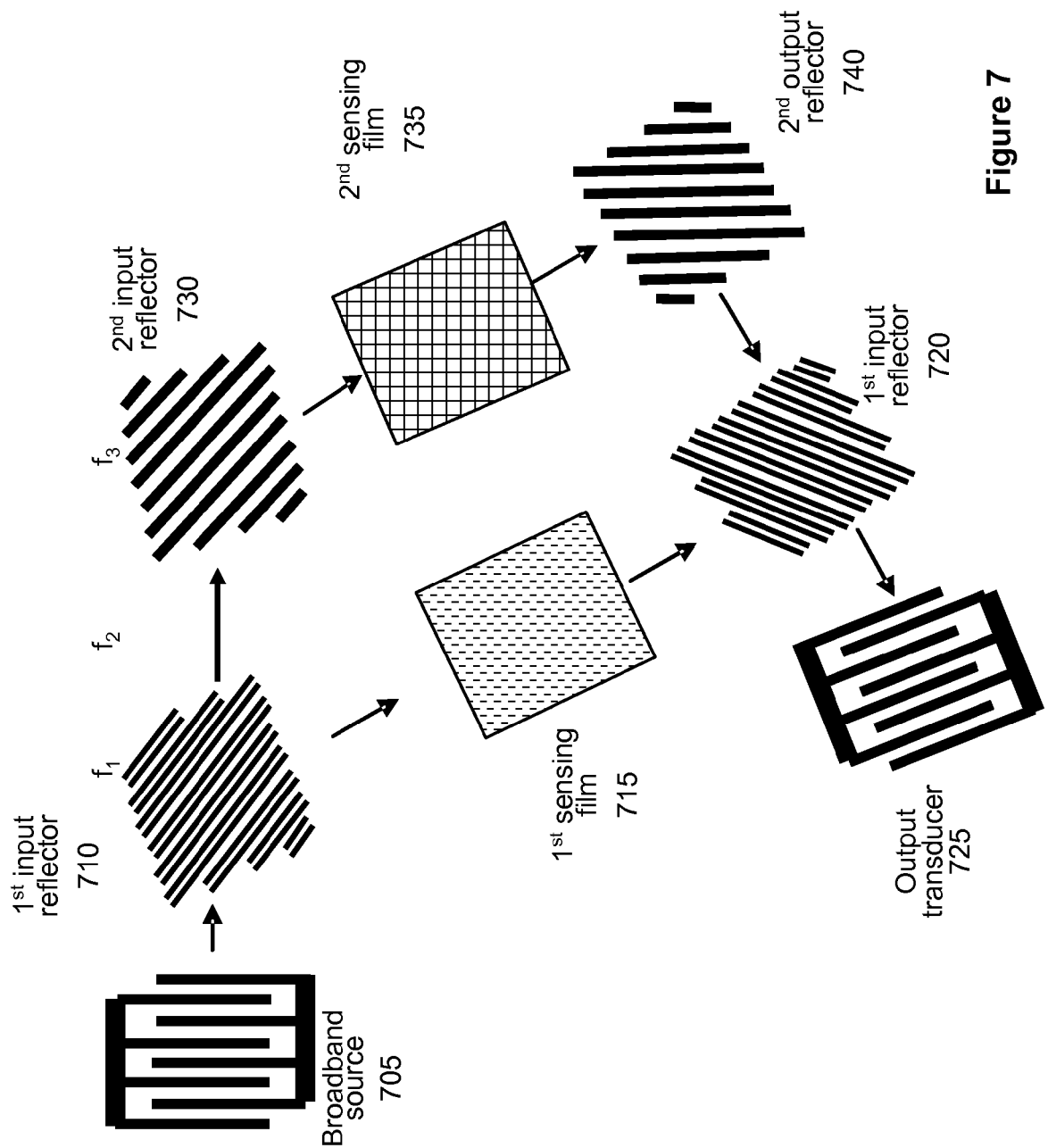
FIG. 7 is a reflective array channelized (RAC) sensor showing a different angular orientation according to one embodiment.

Referring to FIG. 7, a different angular orientation is depicted showing the component orientation. In more particular detail, the broadband source 705 provides the acoustic energy to the input reflectors 710, 730 wherein the incident signal is directed at a different angle that reflects the properties of the symmetry of the crystal, such as 60 degrees. The signal impinges upon the sensing films 715, 735 and then to the output reflectors 720, 740 before being extracted by the output transducer 725.

Figure 8:
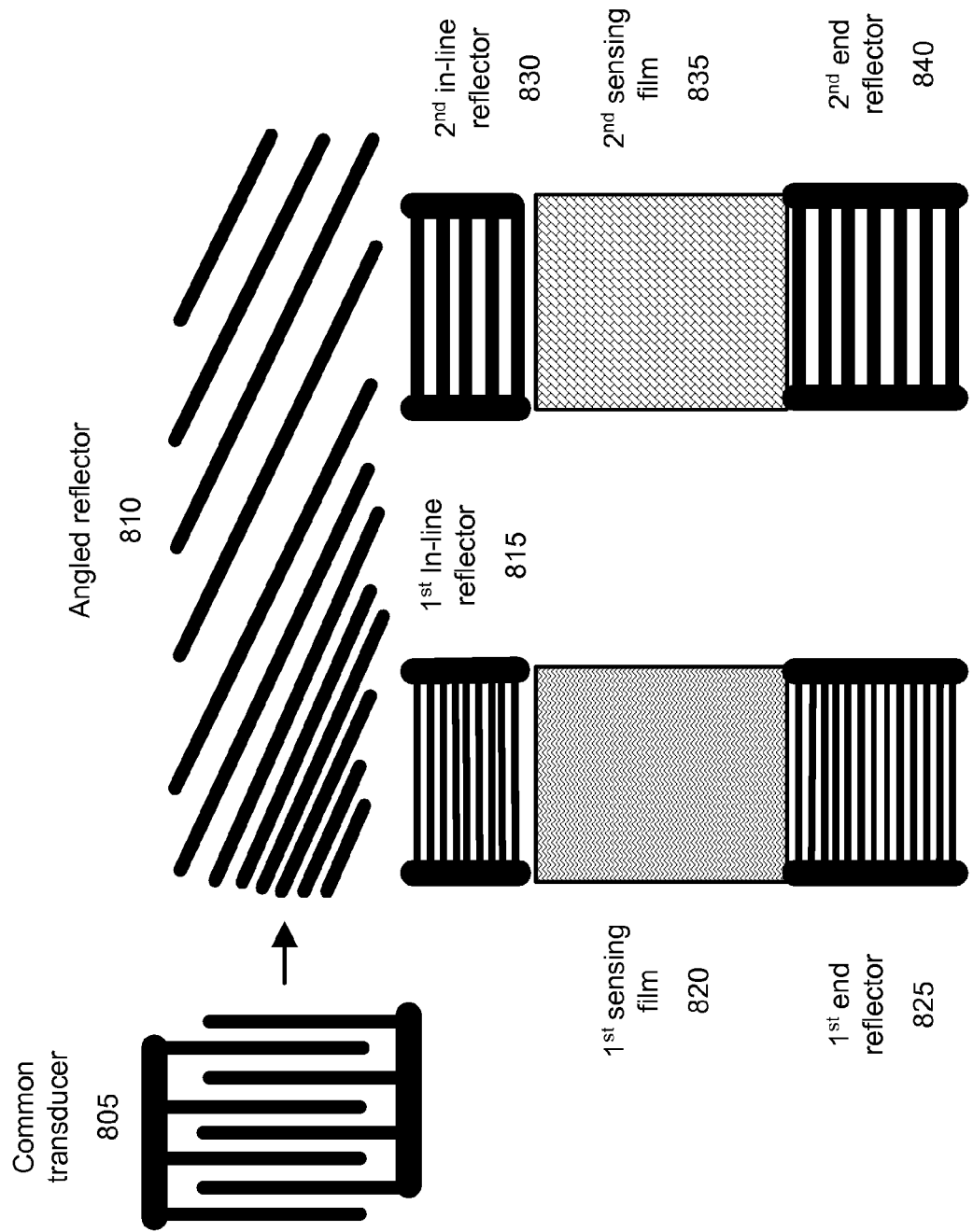
FIG. 8 is a reflective array channelized (RAC) sensor with a common transducer including a common chirped input reflector according to one embodiment. The figure also illustrates several acoustically coupled resonators coupled to the input reflector.

In certain embodiments, it is desirable to have a high Q resonance in wireless passive sensors. In particular, sensors which are interrogated with a broadband tone burst and in which the resonant frequency is employed as the sensing parameter require a passive "ring time" sufficiently long to obtain good frequency resolution. Referring to FIG. 8, a further embodiment includes a common chirped or discrete array of oblique angled reflectors 810. The common input/output transducer 805 provides the broadband signal that is reflected by the angled reflector 810 into the discrete frequency channels. In this embodiment, the continuously-varying (chirped) distributed reflector 810 of the reflective array compressor can be employed, ensuring no frequency mismatch between the incident energy and the narrow bandwidth resonators.

In one example, the invention is not limited to the delay line echo mode of operation. By placing semi-reflective gratings in-line grating 815, 830 into the transverse sensing path, an array of one port acoustic resonators is created. Each resonator is at a unique frequency within the band of the source transducer 805. The acoustic energy from the source transducer 805 is weakly coupled into all of the resonators to which there is spectral content diverted by the chirped oblique angled reflector 810 thereby charging the resonators with acoustic energy at their resonant frequency. The end reflectors 825, 840 are typically complete reflectors and reflect back all the incident signals. The energy then slowly leaks from the semi-reflective in-line grating 820, 830 through the chirped oblique angled reflector 810 and back into the common transducer 805.

The constraints on the sensing films, the spacing between reflectors, and other design parameters are routine to one skilled in the art and can be predicted using coupling of modes or other well known theoretical frameworks. Generally the sensing regions 820, 835 must either cover the reflectors or be sufficiently short to minimize the numbers of resonant modes per sensor path in the implementation of FIG. 8. End reflectors 825, 840 should have maximum reflection coefficient while the reflection coefficients of semi-reflective gratings 815, 830 must be low enough to allow signal insertion and extraction but high enough to provide adequate ring time of the resonator.

There is also no specific width requirement for the lateral sensor paths, however the widths should be sufficiently large to prevent diffraction and waveguide mode issues. Also, since the reflectors 810 are typically at 45° angles, the spread in location versus frequency is such that the desired frequency is likely to be distributed over a region as wide as the width of the source transducer or wider.

By way of further illustration, since per-element reflection coefficients much in excess of 1% lead to scattering into bulk waves, a 100-element (50 wavelength) lower limit on the coupling reflectors is used in one embodiment. Since narrow transitions between frequency channels are desired, even more elements are desirable and practical widths for the lateral sensor beams are on the order of 100-200 wavelengths. Reciprocity demands that for complete reflection back into the main beam the width of the longitudinal distribution path, and therefore of the transducers, must be comparable. At 300 MHz the wavelengths are on the order of 10 microns (1-2 mm beams) and at 915 MHz the wavelengths are on the order of 3 microns (0.3-0.6 mm beams). A 20-channel sensor with 2 mm beams might be 6 mm wide and 50 mm long, allowing standard wafer scale manufacturing to obtain a moderate number of 20-measurand sensors per 75 mm or 100 mm piezoelectric wafer at the lowest practical frequencies.

Figure 9:
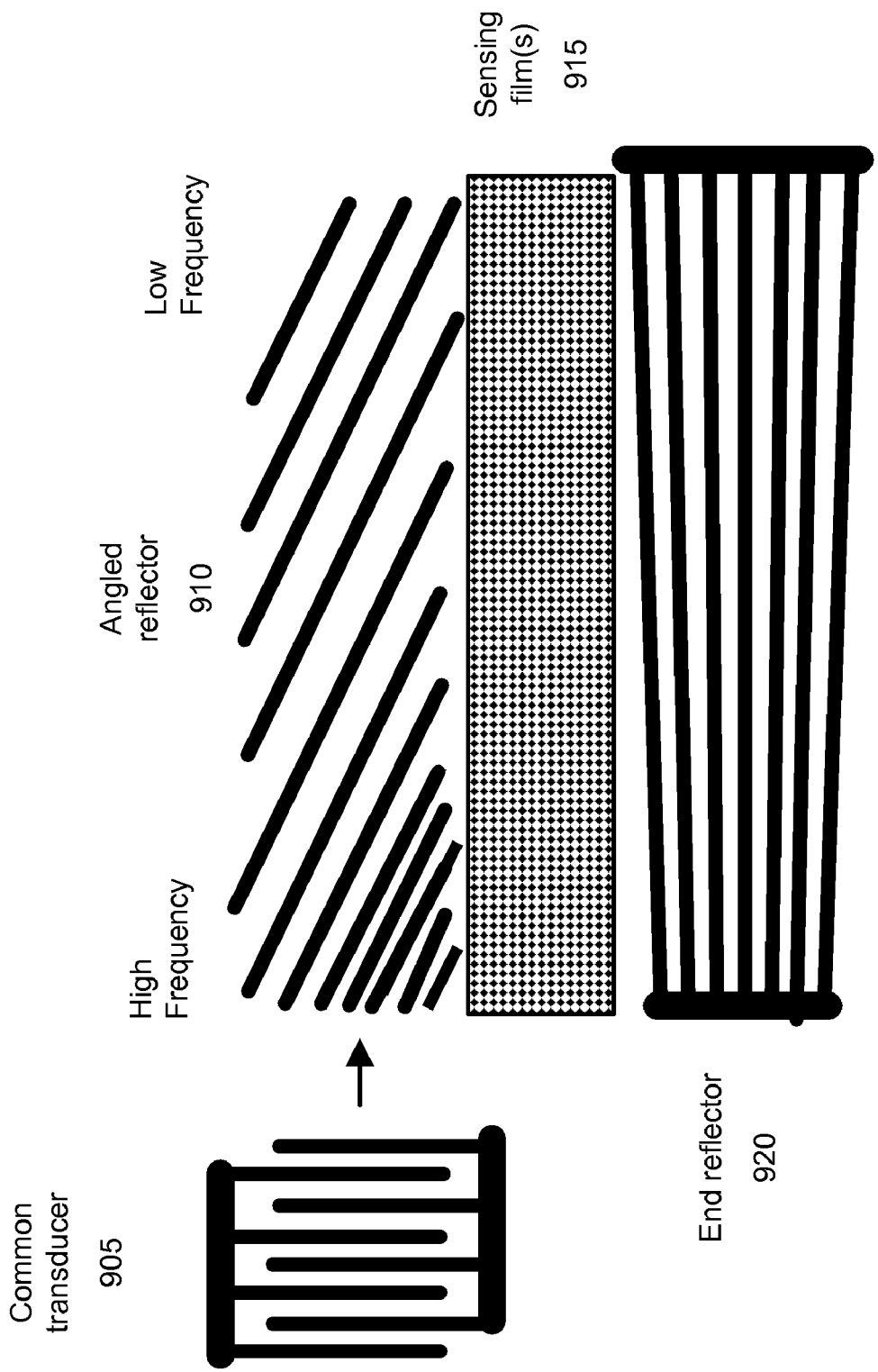
FIG. 9 is a reflective array compressor sensor with a common transducer including a common input reflector and a common slanted end reflector according to one embodiment, implementing a one-port reflective array compressor.

The continuous sensor is also suitable for passive wireless applications by an extension of the "end reflector" of the discrete sensor. Referring to the one port device of FIG. 9, the common transducer 905 launches energy into the longitudinal distribution beam where it is distributed by angled reflector 910 having continuously variable pitch into sensing region 915. The signals then impinge upon the slanted finger end reflector 920 and the signals are reflected back through the sensing region 915. In this embodiment, the slanted finger reflector (SFR) 920 is designed to have the same local period as the angled reflector 910 in any lateral cross-section through the oblique angled reflector, sensor film, and slanted reflector. Note that a plurality of sensing films may be employed and that this example is not meant to be limited to a single measurand.

Such a sensor allows a wireless interrogation via an antenna (not shown) into the transducer 905 to interact with the entire sensor region 915 using the local pitch of reflectors 910 and 920 to define a frequency selective region of interaction along the length of the device.

An advantage of this sensor embodiment is that all of the various sensing films are incorporated into a single device, sharing statistically correlated manufacturing tolerances and operating in a "self aligned" process. By placing each individual sensing film into a frequency-addressable path of the same sensor, it is feasible to place more individual sensor functions within a given bandwidth or volume.

The art related to encoding an individual device are varied. Fundamentally either an impulse is applied and the output is convolved with a matched filter or a matching interrogation signal is transmitted while the impulse resulting from convolution of the interrogation code and the sensor's encoding is sought for. In practice it is likely that neither the transmission nor the retransmission would employ an impulse for many power handling and noise immunity reasons. Instead, a three-part convolution in which a spread spectrum signal is transmitted, embedding a portion of the matching code's Fourier transform with a transmission spectrum, $X(F)$, is used. The retransmitted signal would be the product of this spectrum and the sensor's filter function, $S(F)$. The receiver would then further filter with a receiver filter function, $R(F)$, such that $X(F)*S(F)*R(F)=\exp(-j\omega\tau)$, being a time delayed impulse. There are numerous other methods of encoding. In practice, the "filter" functions $X(F)$ and $R(F)$ are implemented in software; the "impulse" has finite width (is band limited); and the sensing mechanism causes $S(F)$ to deviate from approximating $(X(F)*R(F))^{-1}$. Nonetheless practical coding schemes follow some analog of this process and the problem of introducing several programmable phase shifts into the channels of S(F) as a bit code and then determining X(F) and R(F) to decode the bits is mathematically mature and computationally efficient.

The existing signal processing for reflective array compressor filters exclusively involves Rayleigh SAW devices. However, some of the applications for the technology are in biochemical and other fluid phase sensing applications with certain special considerations. There are material substrates typified by 36° rotated Y-cut lithium tantalate and 41° rotated Y-cut lithium niobate that offer extremely high piezoelectric coupling to a nearly pure shear horizontal SAW (SH-SAW) along the X-axis of propagation. The propagation at right angles to X is characterized by a pure shear wave with no piezoelectricity and a pure Rayleigh wave. One embodiment is a shear horizontal RAC (SH-RAC) sensor using such orientations to address these applications, using the teachings herein along with the careful selection of orientation and wave guiding structures. SH-RAC may be implemented using the approach herein, for example, with crystals of symmetry 3 m. Bluestein-Gulayev wave orientations, such as on lithium tetraborate offer another embodiment. An SH-RAC substrate is defined herein as a material and associated surface plane supporting piezoelectrically coupled SH-SAW propagation in at least one direction and a pure-SH wave, with or without piezoelectric coupling, in another direction. In other words, a substrate having at least one axis of propagation along which a transducer launches a shear horizontal wave and another axis into which it can be reflected with no mode conversion. An SH-RAC shall be defined as a RAC device, as described herein, manufactured on an SH-RAC substrate.

There exist alternate methods of distributing a broadband input signal over a spatially diverse array of sensing locations or pixels. One such method uses the composite transducer of a slanted array compressor filter to create the slanted array channelized (SAC) sensor array. A composite transducer consists of several laterally translated subsections, each optimized to a different frequency band. In the compressor, the subsections have continuously overlapping frequency bands; however in the sensor implementation there is a desire for spatial orthogonality of the various acoustic beams. This is readily accomplished through "poor" compressor design, as was pursued in the RAC embodiment. For example each transducer may have a weighting function (apodized or withdrawal weighted) to introduce a desired pass-band shape with low spurious responses and steep skirts. The individual segments can be better spaced in frequency than would be desired in a compressor. Finally, the individual segments can carry fixed encoding to make them not only spatially and spectrally orthogonal but also code orthogonal.

According to one embodiment, a slanted array compressor's composite IDT is used to introduce and distribute a broadband electrical energy signal source into multiple, narrow-band, channelized frequency bands by a staggered, segmented, source transducer such that the channels are routed to parallel, frequency-addressable paths of narrow-band, acoustic energy signals. These acoustic energy signals are then transmitted through the sensing material and thereafter either reflected back by appropriate reflectors or retrieved and reassembled into a broadband altered electrical energy signal by a staggered, segmented, receiver transducer. The use of the slanted array compressors provides one way to compensate for distortion and second order effects such as those described for the reflective array compressor, which requires that the signal traverse unrelated reflector sections (e.g. $f_3$ traveling through $f_1$ and $f_2$) and introduces certain negative effects on the signal processing. To provide an alternative, the slanted array compressor can be implemented wherein the slant array compressor slants the transmitter and receiver transducers at some angle wherein the source transducer and the receiver transducer are coupled in parallel.

Figure 10:
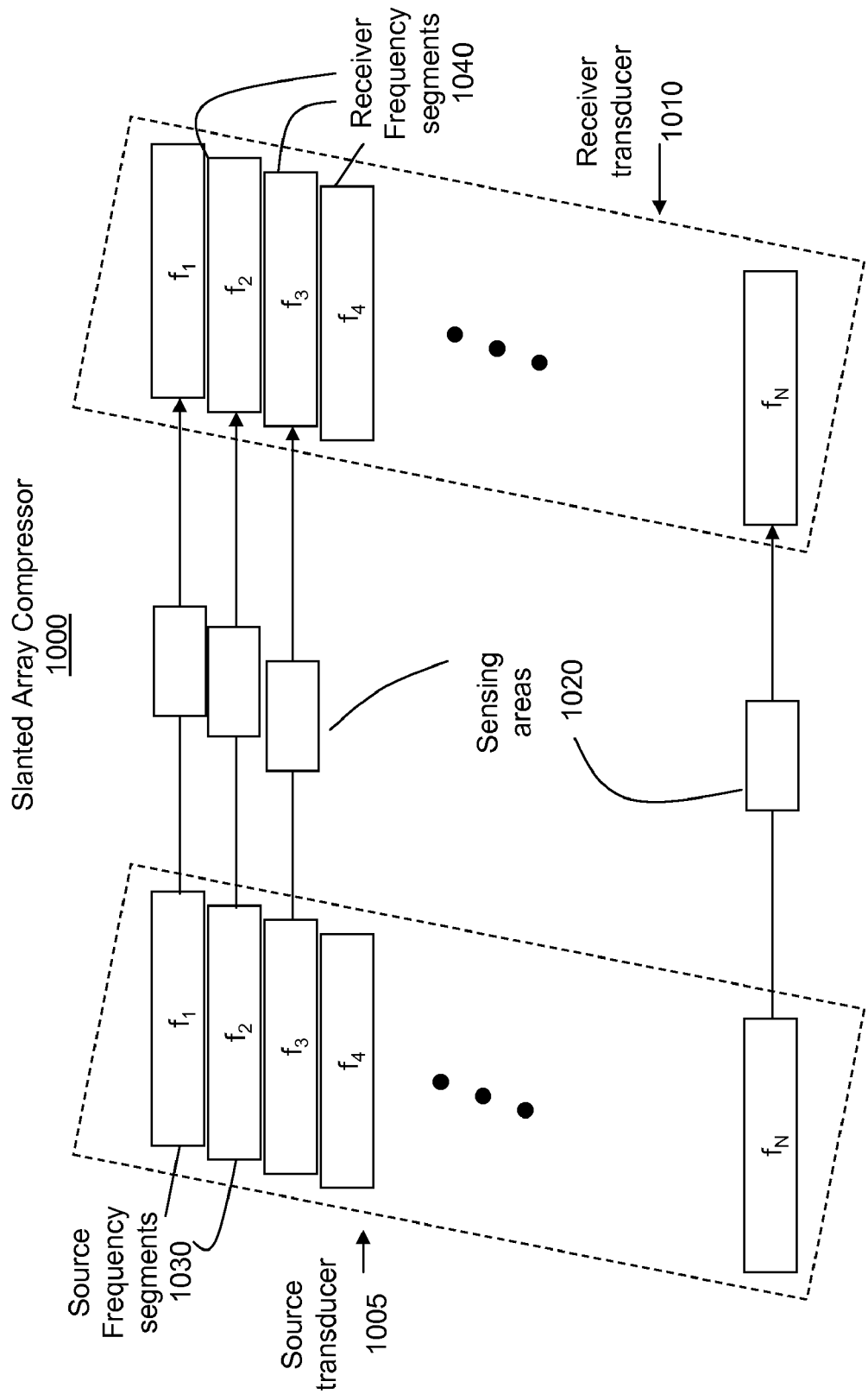
FIG. 10 is a slanted array channelized (SAC) sensor showing the discrete frequency segments according to one embodiment.

Referring to FIG. 10, a slanted array channelized (RAC) sensor array 1000 is depicted with a pair of slanted source transducers 1005, 1010 having a plurality of frequency dependent segments 1030, 1040. The transducers are arranged and slanted in such a manner that the segments 1030, 1040 are equidistant and have essentially the same delay component but at different frequencies $f_1$, $f_2$, $f_3$-$f_N$, wherein every segment represents a different frequency band. The acoustic energy from the source transducer 1005 impinges upon sensing areas 1020 and the corresponding sensed response is received in the receiver transducer 1010.

An advantage of this SAC sensor array embodiment is that there is only one propagation direction and it is inherently channelized using a discrete implementation. This may be particularly well-suited for wireless implementations as it may have less loss.

The use of SH-SAW and other shear horizontal substrates is desirable for liquid phase applications of the SAC and is within the scope of this invention.

The use of interferometric techniques is accomplished by individually transmitting $f_n$ and $f_{n+1}$ into adjacent channels using separate IDT segments but receiving them in common using a single output segment.

According to one embodiment, certain sensing films 1020 are missing in order to provide reference signals that are close to the sensed frequency thereby facilitating self calibration.

Coding of the sensor can be accomplished in several ways depending upon the number of sensors deployed. For example, since the channels are distinguished by different frequencies, a wideband device can accommodate a large number of different frequencies and the coding can be done in the frequency domain. For example, certain frequency bands can be nulled to identify a particular sensor such as by using a coating or blocking medium. Coding can also be done by the arrangement of in-line reflectors to provide reference signals at certain frequencies in order to distinguish devices. Several other techniques for distinguishing devices using frequencies are also known to those skilled in the art.

In another embodiment, a metal film can be used, similar to the phase plate noted herein, wherein each segment can be subjected to a phase coding in order to distinguish the sensor. MEMS devices can be incorporated into the structure to provide a switching means to modify the coding and therefore identify a sensor. By coding with such a bit stream, the sensor is addressable and sends back correlation pulses.

In more specific detail of one embodiment, a metal layer film that may or may not be continuous can have chunks at each frequency for some separation of the spatially diverse areas. Blocks can be established at F1, F2 . . . and these would not chirp, making it easier to interpolate between readings. With respect to the coding, any arbitrary number of pixels or bits can be implemented depending upon the operations. If used as an RFID tag, it can be used so that phase shifting creates + and − bit sequences in frequency so that if interrogated instead of a signal pulse but with the right opposite code, it will come back with '1' or '0' for an n bit code. Various coding schemes can be implemented such as Barker code and Hamming code. In sensor applications, it is now possible to measure uniform loading using factors such as temperature, strain, and torque with an RFID tag that can be interrogated by a code among a plurality of RFID tags.

The frequency band associated with a particular segment 1030, 1040 is typically a function of the manufacturing process resolution and generally can be a very wideband overall frequency with many different segments.

In this particular embodiment, the linear phase for each segment is the same and the transmission time/delay is the same. While depicted that each segment 1030, 1040 is about the same size, a further embodiment includes having the segments of different sizes. For example, certain sensing applications may require a more sensitive reading having greater resolution or simply be more difficult to sense, wherein the device can have an elongated segment.

In the various radar implementations, guard bands were not typically used, however in one embodiment of the sensing application described herein, a guard band is employed on at least one of the segments in order to improve the isolation characteristics. For example, a particular measurand may be more difficult and require a more accurate.

Figure 11:
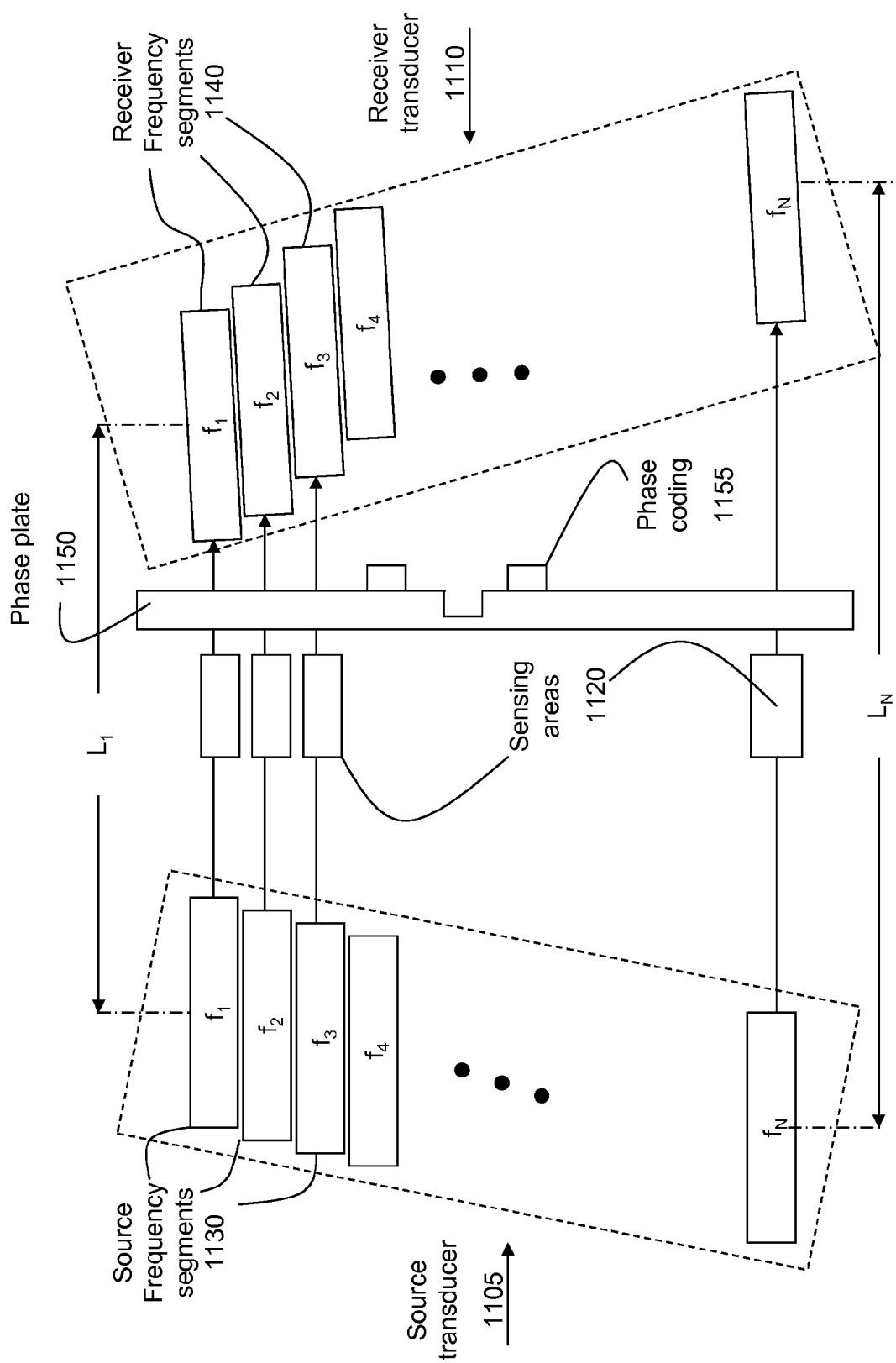
FIG. 11 is a slanted array channelized (SAC) sensor showing the discrete frequency segments including a phase plate according to one embodiment.

Referring to FIG. 11, another type of slanted compressor device is depicted. Once again, the compressor provides channelized frequency components however in this non-linear embodiment the time delay between the segments is different and the phase between segments is different. As noted, the distance $L_1$ is shorter than the distance $L_N$ and thus there is a time delay differential and a dispersive response.

According to one embodiment, a phase plate 1150 can be disposed between the source transducer and the receiver transducer. The phase plate typically is a thin metal film that is designed to provide for phase correction and used to obtain a quadratic phase using a phase plate by including some metal for each channel.

The geometry of the phase plate 1150 selectively perturbs the velocity of the acoustic waves and in applications such as pulse compression radar, the signal waveforms are adjusted to ensure a quadratic differential phase response. In one embodiment the phase plate 1150 is used to provide a phase shift coding to change the phase code for each frequency band by use of a grating structure having bumps and indents 1155. Such usage of the phase plate 1150 allows the sensor to be coded to distinguish the sensor from among other sensors. For example, the phase plate 1150 can establish a code pattern for each segment such as $\pi/2$, $3\pi/2$, $\pi/2$, $3\pi/2$ . . . . In certain applications, such as trying to measure the temperature of a concrete structure having multiple temperature sensors, the individually addressable sensor can be excited with a signal that is pre-coded for that sensor. The reflective array embodiments can also include a phase plate.

In another embodiment, multiple bands can be incorporated into the phase plate, especially with a strong coupling material, implementing gratings that can provide open/short circuits to adjust the phase characteristics. The open/short circuits can be switched in another embodiment to dynamically adjust the phase characteristics and make a universal phase plate. The phase plate provides an easy mechanism to provide coding and implement orthogonal frequency coding. The phase modulation for each channel can therefore establish a signature for an individual sensor.

Another variable factor for the present invention relates to the transducer geometry. There are various knows types of transducer designs such as split-electrode transducers, dummy fingers, stepped-fingers, curved finger electrodes and slanted finger electrodes. One such geometry is the slanted finger interdigital transducer (SFIT) wherein the fingers of the IDT are designed for an application to have slanted fingers.

Another embodiment exists in which the composite transducer is replaced with an interdigital transducer having a local pitch and center frequency that varies along the lateral dimension of the transducer.

Figure 12:
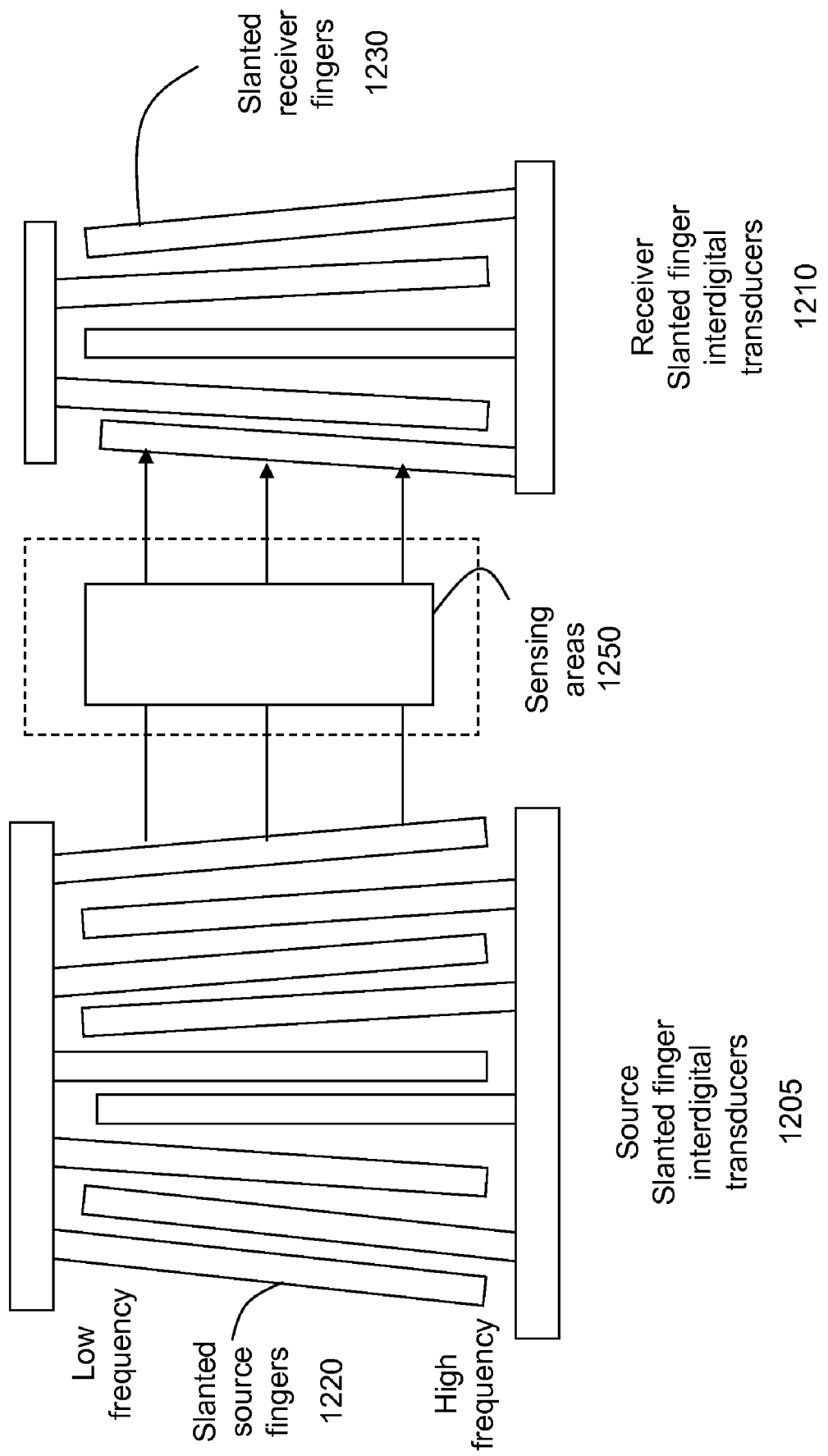
FIG. 12 shows a slanted finger interdigital transducer channelized sensor according to one embodiment.

Referring to FIG. 12, a slanted finger interdigital transducer (SFIT) sensor configuration is shown wherein the acoustic wave signals from the SFIT vary along the length of the device. Similar to the reflective array example of FIG. 1a, this variation does not have discrete and separate channels, but rather has a continuum of geographically dispersed spectral content.

The input source IDT 1205 has a plurality of slanted fingers 1220 that convert a broadband electrical energy signal into a continuum of acoustic energy signals with a frequency that varies along the width of the transducer 1205 (length of the individual slanted electrodes). The acoustic energy is input to at least one sensor path 1250 by frequency addressable excitation due to the spatial localization of coherent transducer operation along the lateral dimension (top to bottom in the figure) and then input to a receiver transducer 1210. The receiver transducer 1210 also has slanted fingers 1230 that are designed to have coherent detection at frequencies and locations that match the frequency generated by the input transducer 1205 at the corresponding lateral location. Put simply, the acoustic wavelength is coherent from left to right and vice versa along any horizontal cross-section through the transducers and intervening sensing area and varies continuously along any vertical cross-section.

It should be understood, that the RAC and SAC sensor array implementations are just a few of the possible combinations that are within the scope of the invention. There are various sensing requirements that may require a mix of gratings, absorbers, sensing materials and transducers in some combination not explicitly shown in the figures. Such a configuration is intended to be within the scope of the invention and only illustrative examples are noted herein. The use of a SAC or SFIT transducer to extent the bandwidth of the transducers in a RAC is also explicitly considered.

According to one embodiment, dispersive acoustic wave devices offer a means for frequency-selective addressing of spatially distinct sensing or phase encoding elements, and this class of devices offers significant advantages over traditional acoustic wave devices in sensing applications. It should be noted that the deviation from linear phase is not the salient property and even non-dispersive devices made from these dispersive elements offer the advantages disclosed. In one embodiment, the use of frequency channelization to address a desired sensor pixel in an array.

Figure 13:
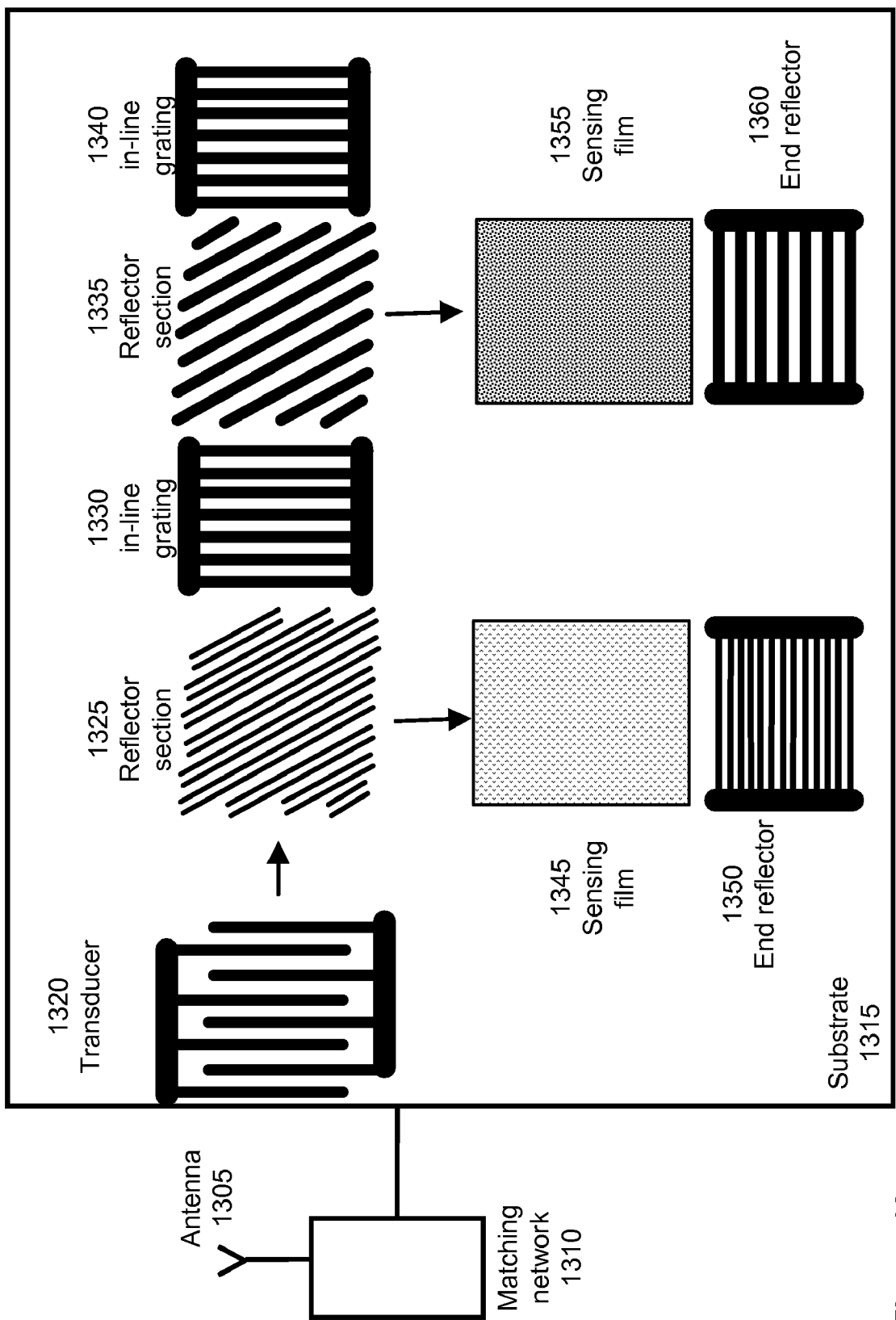
FIG. 13 shows one embodiment of a block diagrammatic perspective of the sensor system disposed on a substrate.

Referring to FIG. 13, one embodiment of the system disposed upon a substrate is depicted. The coupling to an external antenna 1305 with an optional matching network 1310 shows how signals can be received and transmitted according to one embodiment. In this embodiment, the common transducer 1320, reflector section 1325, 1335, in-line gratings 1330, 1340, sensing films 1345, 1355 and end reflectors 1350, 1360 are all disposed upon a substrate 1315.

The individual reflectors that make up the reflector section 1325, 1340 can be grooves disposed on or about a surface of the substrate 1315 with the geometry and groove period defining how the incident acoustic beam is processed. In this embodiment the high frequency signals are extracted first by the fine pitch or smaller groove period of the first reflector section 1325. The reflected spectrum exiting the reflector section 1325, 1340 impinge upon the sensing materials 1345, 1355 with the corresponding frequency and may be influenced by the sensing film thereby providing altered reflected signals. The altered reflected signals are then reflected back to the reflector sections and back to the common transducer 1320. Likewise, the in-line gratings 1330, 1340 reflect back some portion of the impinging signal that can be used as a reference in certain embodiments.

Certain applications in biochemical and other fluid phase sensing applications have special considerations. There are material substrates typified by 36° rotated Y-cut lithium tantalate and 41° rotated Y-cut lithium niobate that offer extremely high piezoelectric coupling to a nearly pure shear horizontal SAW (SH-SAW) along the X-axis of propagation. SH-RAC may be implemented using the approach herein, for example, with crystals of symmetry 3 m. Bluestein-Gulayev wave orientations, such as on lithium tetraborate offer another embodiment. SH-RAC substrate is a substrate material and associated surface plane supporting piezoelectrically coupled SH-SAW having at least one axis of propagation along which a transducer launches a shear horizontal wave and another axis into which it can be reflected with no mode conversion.

In a wireless sensor application, in which encoding would be helpful, it is also desirable to have a single electrical port. As noted herein, one means of accomplishing this is to employ reflective arrays to fold the acoustic energy back onto the common transducer. Another is to simply connect the input and output transducers. A third method is to replace the complementary reflective array with an array of traditional narrowband in-line reflectors, each returning the incident energy back to the beam-splitting reflector and subsequently back to the input transducer. All of these approaches are illustrated in some fashion in the preceding examples, singularly or in combination, or are otherwise understandable from the figures.

A two-port device can be implemented using a second, complementary composite transducer. A one-port device can be implemented using an array of narrowband transducers. In this embodiment the composite transducer provides the functionality of the input transducer and the beam-splitting grating. All of the coding and sensing mechanisms of the RAC can be applied to the SAC and vice versa.

Another embodiment for reflective array sensors relates to nontraditional substrates. There are applications in which the scale of measurement is unsuitable to microlithography, wherein it is possible to excite surface waves on a stainless steel rod or other macroscopic structures using the well-known wedge transducer. A simple half-wavelength resonator is affixed onto a wedge and the wedge is affixed onto the plate or rod such that the bulk waves in the wedge couple to surface waves on the substrate. Etched or machined grooves in the plate serve the same function as the metal strip reflectors typical of microlithographically manufactured SAW devices.

A number of mechanisms can be used to generate acoustic wave energy onto the substrate. From signal processing viewpoint, wedge transducers are not advantageous, however for gross sensing applications a wedge transducer can be satisfactorily employed according to the inventions detailed herein. One implementation is a transmission sensor consisting of a rod or bar of corrosion-resistant elastic material such as stainless steel or met-glass, supporting an input and output transducer of the wedge transducer type, said input transducer converting bulk acoustic energy into a beam of surface guided acoustic energy, said energy propagating through one or more oblique angled reflectors. The transversely reflected signals at varying frequencies are then redirected by one or more complementary oblique angled reflectors to said output wedge transducer. The apparatus is sealed at the wedges, preventing damping of the surface waves by the sealant but isolating the acoustic wave sensing structure from the electrical connections to the wedge transducers. Upon immersion into a liquid to a controlled depth, those frequency components traveling into the liquid loaded area will sense the properties of the liquid or will be completely damped by liquid loading. The apparatus thus serves as a dipstick or depth profiling sensor. By virtue of the exclusion of piezoelectric elements or electrical contacts in the sensing environment it is intrinsically safe and explosion-proof. Such a sensor would experience significant applicability to chemical processing and fuel tank monitoring.

The use of a shear transducer and/or a bi-layered substrate can further provide a sensor with macroscopic scale suitable for liquid phase measurements. Such a sensor could be produced to be several meters in length and could serve to monitor phase boundaries and liquid levels in large vessels as well as to measure viscosity as a function of depth.

In another embodiment, the arbitrary angle of the input oblique reflector array is selected to be 180°. That is, the chirped reflector is designed to reflect different frequencies directly back to the source transducer at different distances from the source transducer. In one such embodiment, an accurate level sensor can be obtained by employing, for example, a metal column such as stainless steel. The column would have etched grooves to create the (now in-line) chirped reflective structure. A piezoelectric material can be bonded or disposed on the surface of the column such that it launches extensional bulk waves of channelized acoustic energy and converts said energy into a SAW or similar wave in the column. A waveguide or slot may be used to focus the energy and lower the problems of reflections and lateral coupling. By examining the reflected signal response, the level is determined by the cut off frequency.

In a further embodiment, the acoustic energy is provided by lasers that are phase matched with the system. By way of illustration, a tiltable laser optic system to change the angle over time can be a broadband source.

According to one embodiment, frequency addressable microelectromechanical systems (MEMS) devices are incorporated to provide the bit coding sequence wherein the MEMS open and close to provide a path for the signal reflections. The MEMS can gate the acoustic energy and block incident energy.

Sensors of this type using a polymer or other substance, as might be used in a chromatography column, disposed between the complementary reflectors may be used to measure the time-evolution of diffusion of a liquid or vapor sample through the polymer, creating a real-time chromatograph.

In one embodiment, the sensors employ a polymer or other film, to selectively detect or bind a certain analyte which is disposed between the complementary reflectors and is used to evaluate the frequency-dependent effect of the film-analyte reaction on the acoustic wave propagation. Such a device probes the frequency dependent viscoelastic interactions and provides data redundancy for enhanced selectivity.

According to one embodiment, sensors use a sequence of discrete regions of polymers or other films, each interacting with a predetermined band of the spectrum through spatial diversity of the signal, may be used to implement a multi-analyte sensor with frequency-addressable interrogation.

By way of example, sensors may be encoded by placing regions of a film to introduce a sequence of 0° and 180° or other transmission phases between the complementary reflectors to create a coded impulse response. Such devices can be used as code-addressable physical sensors in which the entire coded response varies with a parameter such as pressure, temperature, strain or the like. Combining chemically insensitive 0° and 180° (or other encoding phase value) encoding regions with (bio)chemically selective sensing regions it is possible to encode a (bio)chemical multi-analyte sensor.

While the prior art in signal processing employs a smoothly varying reflector pitch to obtain a desired phase-frequency response for pulse expansion or compression, the sensor application would benefit from discrete beams of essentially monochromatic acoustic waves. Provided the two reflectors are complementary, it is possible to implement a large number of such monochromatic beams, the most significant limitation being crystal size.

According to another embodiment, the techniques herein apply to any dispersive device technology for spatial diversity. One of the embodiments is a device that tracks inherently due to structure of a single device that gets around needing to have separate sensors for each the different analytes.

Some applications include tire pressure monitoring systems wherein multiple wireless sensors are presently required such that the sensor is identifiable and addressable.

According to one embodiment the system operates by employing certain spread spectrum features. A spread spectrum signal and power is spread out over time and frequency and run through a complimentary device such that a reconstituted signal is a sharp pulse. This is used in radar applications instead of sending out a large power narrow pulse.

With respect to certain sensing application, the dispersive aspects are not important and it is the spatial routing of the signal employed to obtain dispersion that is sought. The system allows addressing a locale on the intervening area by what frequency the sensor is interrogated. Multiple sensing films and each with certain frequency characteristics can be used wherein one can see what is happening at a certain film by interrogating at that frequency.

By way of example, instead of four different sensors with four different carefully crafted frequencies that split the ISM band with corresponding guard bands, the present invention can use one sensor that can be swept/switched between the sensors and provide the measured information.

Certain reactions between polymers and the acoustic wave devices underneath them are frequency dependent. So in certain implementations, such as biosensor arrays, one may obtain an improvement in separation between what is changing in the polymer compared to other effects within the device by employing a swept frequency measurement with one biochemical or polymer along the entire sensing region.

In signal processing reflective array compressor filter applications, the fine grating between the fingers is typically never perfect therefore the chirp response is imperfect. Thus in one embodiment, a sufficiently wide track is used between the reflective arrays so a metal film can be patterned so the local length of the metal is the phase correction of the device, correcting to quadratic phase so that the delay time is linear with time. While this is not needed in sensor embodiments, if there is a metal film that is laser trimmed to obtain coding, one can obtain phase shift keying for RFID coding.

It should be understood that the present invention is applicable to various devices such as SAW, BAW and silicon-based MEMS type resonator devices.

In yet a further embodiment, the entire RAC or SAC structure is implemented onto a cantilever structure such as those described in U.S. patent application Ser. No. 11/753,047, which is incorporated by reference herein for all purposes In this embodiment the RAC or SAC can occupy some or the entire cantilever surface and form an active acoustic region.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A sensor system for detecting a target analyte, comprising:
providing an initial acoustic energy signal;
reflecting portions of said acoustic energy signal by a reflector array to a sensing region, producing at least one altered acoustic energy signal, wherein said reflector array has a plurality of individual reflectors, and wherein said reflector array reflects more than one frequency;
receiving said altered acoustic energy signal;
converting said altered acoustic energy signal into an altered energy signal; and
measuring a change between said initial energy signal and said altered energy signal for said detecting of said target analyte.

2. The system according to claim 1, further comprising reflecting said altered acoustic energy signal by an additional reflector array to an output transducer.

3. The system according to claim 1, wherein said acoustic energy source is a common transducer and further comprising reflecting a portion of said altered acoustic energy signal back to said common transducer.

4. The system according to claim 1, wherein said sensing region is selected from at least one of the group consisting of: polymer films, metal films, and metal oxide films, enzymes, antibodies, DNA, and thin membranes.

5. The system according to claim 1, further comprising coding by at least one of the group consisting of: disposing a blocking medium on portions of said sensing region and disposing a phase shift medium on portions of said sensing region.

* * * * *